US011175651B2

United States Patent
Tao et al.

(10) Patent No.: US 11,175,651 B2
(45) Date of Patent: Nov. 16, 2021

(54) METHOD, DEVICE AND SYSTEM FOR PRESENTING OPERATION INFORMATION OF A MOBILE PLATFORM

(71) Applicant: SZ DJI TECHNOLOGY CO., LTD., Shenzhen (CN)

(72) Inventors: Ye Tao, Shenzhen (CN); Liutao Zhang, Shenzhen (CN); Zhiyuan Zhang, Shenzhen (CN); Weifeng Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 443 days.

(21) Appl. No.: 15/725,039

(22) Filed: Oct. 4, 2017

(65) Prior Publication Data
US 2018/0046172 A1 Feb. 15, 2018

Related U.S. Application Data

(63) Continuation of application No. PCT/CN2015/077451, filed on Apr. 24, 2015.

(51) Int. Cl.
*G05B 23/02* (2006.01)
*G08G 5/00* (2006.01)
*G05D 1/00* (2006.01)

(52) U.S. Cl.
CPC ..... *G05B 23/0218* (2013.01); *G05B 23/0216* (2013.01); *G05D 1/0044* (2013.01); *G08G 5/0069* (2013.01); *B64C 2201/00* (2013.01)

(58) Field of Classification Search
CPC ............ G05B 23/0218; G05B 23/0216; G05D 1/0044; G08G 5/0069; B64C 2201/00

USPC ......................................................... 702/182
See application file for complete search history.

(56) References Cited

U.S. PATENT DOCUMENTS

| 8,521,339 B2 | 8/2013 | Gariepy et al. |
| 8,909,391 B1 | 12/2014 | Peeters et al. |
| 2015/0039269 A1* | 2/2015 | Mejegard ............. B60W 40/08 702/182 |
| 2015/0226834 A1* | 8/2015 | Floch ........................ G01S 3/74 342/417 |
| 2016/0284221 A1* | 9/2016 | Hinkle ................. G08G 5/0034 |

(Continued)

FOREIGN PATENT DOCUMENTS

| CN | 1358650 A | 7/2002 |
| CN | 101142122 A | 3/2008 |

(Continued)

OTHER PUBLICATIONS

CN101866180 English Translation (Year: 2010).*

(Continued)

*Primary Examiner* — Michael P Nghiem
*Assistant Examiner* — Dacthang P Ngo
(74) *Attorney, Agent, or Firm* — Anova Law Group, PLLC

(57) ABSTRACT

A method for presenting operational information of a mobile platform includes collecting diagnostic data and travel route data associated with an operation of the mobile platform, and integrating the travel route data with the diagnostic data for presentation. The diagnostic data includes at least one of platform diagnostic data or remote control data. The remote control data is generated by a remote controller associated with the mobile platform or generated by a computer device.

20 Claims, 12 Drawing Sheets

(56) References Cited

U.S. PATENT DOCUMENTS

2016/0297545 A1* 10/2016 Yang .................. B64D 47/08
2017/0205826 A1*  7/2017 Smith ................. G05D 1/0094

FOREIGN PATENT DOCUMENTS

| | | | |
|---|---|---|---|
| CN | 101866180 | A | 10/2010 |
| CN | 102162735 | A | 8/2011 |
| CN | 102266672 | A | 12/2011 |
| CN | 202094531 | U | 12/2011 |
| CN | 102608636 | A | 7/2012 |
| CN | 102830691 | A | 12/2012 |
| CN | 103344240 | A | 10/2013 |
| CN | 103686084 | A | 3/2014 |
| CN | 104133473 | A | 11/2014 |
| CN | 104503462 | A | 4/2015 |
| EP | 2256571 | A2 | 12/2010 |
| JP | S60248494 | A | 12/1985 |
| JP | H04316415 | A | 11/1992 |
| JP | H06219390 | A | 8/1994 |
| JP | H06312700 | A | 11/1994 |
| JP | H09125700 | A | 5/1997 |
| JP | 2001125636 | A | 5/2001 |
| JP | 2003127994 | A | 5/2003 |
| JP | 2003316259 | A | 11/2003 |
| JP | 2008308154 | A | 12/2008 |
| JP | 2010202178 | A | 9/2010 |
| JP | 2011037426 | A | 2/2011 |
| JP | 2015048025 | U | 3/2015 |
| WO | 2004113836 | A1 | 12/2004 |
| WO | 2010097921 | A1 | 9/2010 |

OTHER PUBLICATIONS

The World Intellectual Property Organization (WIPO) International Search Report and Written Opinion for PCT/CN2015/077451 dated Feb. 1, 2016 6 Pages.

* cited by examiner

Interface 1000

| | | 14:37 | | | | ⚙ 🔋100% |
|---|---|---|---|---|---|---|
| ← | | Flight Record | | | ‹ › | ⟲ |

| DJI App | Total Flight Time ⏱ 6 hr 38 min  Total Mileage 🏁 104,898M | Last Flight 15:25:31 📅 02/03/2015  Last Location 📍 Taizhou | | Total Flights ✈ 87  Pilot Level | 1006 |
|---|---|---|---|---|---|

1004

| Favourites ↕ | Dates ↕ | Location | Mileage ↕ | Time ↕ | Max Alt | Photos | Video | Moments 1002 |
|---|---|---|---|---|---|---|---|---|
| ☆ | 25/02/2015 | No GPS | 302 M | 2 Min | 28 M | 0 | 00:00:26 | |
| ☆ | 24/02/2015 | No GPS | 50 M | 2 Min | 18 M | 0 | 00:00:00 | |
| ☆ | 23/02/2015 | Shenzhen | 552 M | 11 Min | 24 M | 3 | 00:00:36 | |
| ☆ • | 21/02/2015 | Shenzhen | 165 M | 5 Min | 63 M | 1 | 00:02:22 | |
| ☆ • | 20/02/2015 | Huizhou | 106 M | 4 Min | 26 M | 2 | 00:01:09 | |
| ☆ • | 20/02/2015 | Huizhou | 430 M | 6 Min | 55 M | 3 | 00:03:18 | |
| ☆ • | 20/02/2015 | Huizhou | 463 M | 6 Min | 63 M | 3 | 00:02:19 | |
| ☆ • | 19/02/2015 | Shenzhen | 13 M | 3 Min | 2 M | 2 | 00:00:15 | |

*FIG. 10*

METHOD, DEVICE AND SYSTEM FOR PRESENTING OPERATION INFORMATION OF A MOBILE PLATFORM

CROSS-REFERENCE TO RELATED APPLICATION

This is a continuation application of International Application No. PCT/CN2015/077451, filed on Apr. 24, 2015, the entire contents of which are incorporated herein by reference.

FIELD

The disclosed embodiments relate generally to mobile platform operations and more particularly, but not exclusively, to methods, devices, and systems for presenting operational information of a mobile platform.

BACKGROUND

Mobile platforms, such as unmanned vehicles, can be used for performing surveillance, reconnaissance, and exploration tasks for military and civilian applications. Unmanned vehicles may be outfitted with a functional payload, such as sensors for collecting data from the surrounding environment. For example, remote-controlled unmanned aerial vehicles (UAVs) can be used to provide aerial imagery of otherwise inaccessible environments.

Analysis of an operation of a mobile platform is crucial to diagnosis of problems that can occur during the operation. Results of the analysis may provide valuable information for repairing the mobile platform as well as development of new mobile platforms. Conventionally, analysis of an operation of mobile platform, such as an operation that occurs during flight of a UAV, is time-consuming, usually requires specialized expertise and provides only limited amount of information that may not be valuable for troubleshooting.

In view of the foregoing, a need exists for improved methods, devices and systems for efficient and user-friendly presentation of operational information associated with a mobile platform, in order to overcome the aforementioned problems and deficiencies of conventional mobile platform technology.

SUMMARY

The present disclosure relates to a system for presenting operational information of a mobile platform and methods for making and using the same.

In accordance with a first aspect disclosed herein, there is set forth a method for presenting operational information of a mobile platform, the method including:

collecting diagnostic data and travel route data associated with an operation of the mobile platform; and integrating the travel route data with the diagnostic data for presentation.

In some embodiments of the disclosed method, the collecting includes collecting the diagnostic data and the travel route data associated with the operation of an unmanned aerial vehicle (UAV).

In some embodiments of the disclosed method, the collecting includes collecting the diagnostic data associated with the mobile platform, wherein the diagnostic data includes gimbal data from the mobile platform.

In some embodiments of the disclosed method, wherein the collecting includes collecting the gimbal data from the mobile platform, wherein the gimbal data includes an absolute coordinate of a gimbal associated with the mobile platform, a range of a gimbal angle of the gimbal, and an angle between a gimbal direction and a direction of the mobile platform.

In some embodiments of the disclosed method, wherein the integrating includes providing a gimbal direction relative to a travel direction of the mobile platform.

In some embodiments of the disclosed method, wherein the integrating includes providing a pitch of a gimbal on the mobile platform.

In some embodiments of the disclosed method, further including:

generating a remote control command according to an input from a user; and sending the remote control command to the mobile platform for remotely controlling the mobile platform.

In some embodiments of the disclosed method, further including generating remote control data according to the remote control command.

In some embodiments of the disclosed method, the collecting includes collecting the diagnostic data, wherein the diagnostic data includes the remote control data.

In some embodiments of the disclosed method, the sending includes sending a remote control command to the mobile platform, the remote control command includes a platform movement command, and the integrating includes detecting an inconsistency between a movement of the mobile platform and the platform movement command.

In some embodiments of the disclosed method, the collecting includes collecting the diagnostic data associated with the mobile platform, wherein the diagnostic data includes remote control operation data from a remote controller associated with the mobile platform.

In some embodiments of the disclosed method, the collecting includes collecting the diagnostic data associated with the mobile platform, wherein the diagnostic data includes location data from a remote controller of the mobile platform.

In some embodiments of the disclosed method, the collecting includes collecting the diagnostic data associated with the mobile platform, wherein the diagnostic data including global position system (GPS) data from the remote controller of the mobile platform.

In some embodiments of the disclosed method, the integrating includes detecting an inconsistency between a movement of the mobile platform and a platform movement command provided by the remote controller.

In some embodiments of the disclosed method, the integrating includes integrating the travel route data with the diagnostic data for presentation in real time with the operation.

In some embodiments of the disclosed method, the collecting includes collecting the diagnostic data associated with the mobile platform, wherein the diagnostic data includes a battery voltage level from the mobile platform.

In some embodiments of the disclosed method, the collecting includes collecting the diagnostic data associated with the mobile platform, wherein the diagnostic data includes a battery current level from the mobile platform.

In some embodiments of the disclosed method, the collecting includes collecting the diagnostic data associated with the mobile platform, wherein the diagnostic data includes smart battery data from the mobile platform.

In some embodiments of the disclosed method, the integrating includes calculating a threshold battery power needed for returning to a home point according to a distance between the home point and the mobile platform, and generating a battery power alert when battery power reaches the threshold battery power.

In some embodiments of the disclosed method, the collecting includes collecting the diagnostic data associated with the mobile platform, wherein the diagnostic data includes camera data from the mobile platform.

In some embodiments of the disclosed method, the collecting includes collecting the camera data, wherein the camera data includes a shutter speed, an International Standards Organization (ISO) sensitivity setting, and an aperture size.

In some embodiments of the disclosed method, the integrating includes providing a location of the mobile platform at a time of acquiring an image.

In some embodiments of the disclosed method, the integrating includes providing location of the mobile platform at a time of starting recording a video and at a time of stopping recording the video.

In some embodiments of the disclosed method, the collecting includes collecting the diagnostic data associated with the mobile platform, wherein the diagnostic data includes home point data from the mobile platform.

In some embodiments of the disclosed method, the integrating includes providing a home point of the mobile platform.

In some embodiments of the disclosed method, the integrating includes providing a direction of the mobile platform relative to a travel direction of the mobile platform.

In some embodiments of the disclosed method, the collecting includes collecting the diagnostic data associated with the mobile platform, wherein the diagnostic data includes a travel warning for the operation of the mobile platform.

In some embodiments of the disclosed method, the collecting includes:
  receiving the diagnostic data and the travel route data at a predetermined time; and
  storing the diagnostic data and the travel route data chronologically.

In some embodiments of the disclosed method, the storing includes associating the diagnostic data and the travel route data with a time stamp.

In some embodiments of the disclosed method, the integrating includes integrating the travel route data in synchronization with the diagnostics data.

In some embodiments of the disclosed method, the integrating includes estimating a crash location of the mobile platform after ground communication with the mobile platform is lost.

In some embodiments of the disclosed method, the collecting includes collecting the diagnostic data and travel route data to be downloaded.

In accordance with another aspect disclosed herein, there is set forth an apparatus for presenting operational information of a mobile platform, the apparatus including:
  a transceiver for receiving platform diagnostic data and travel route data associated with an operation of the mobile platform; and
  a processor for integrating the received travel route data with the received platform diagnostic data for presentation via a display system.

In some embodiments of the disclosed apparatus, the apparatus is configured for using with a remote mobile platform.

In some embodiments of the disclosed apparatus, the transceiver is configured for receiving the platform diagnostic data and the travel route data associated with an unmanned aerial vehicle (UAV).

In some embodiments of the disclosed apparatus, the transceiver is configured for collecting the platform diagnostic data associated with the mobile platform, the platform diagnostic data includes gimbal data from the mobile platform.

In some embodiments of the disclosed apparatus, the transceiver is configured for collecting the gimbal data from the mobile platform, wherein the gimbal data includes an absolute coordinate of a gimbal associated with the mobile platform, a range of a gimbal angle of the gimbal, and an angle between a gimbal direction and a direction of the mobile platform.

In some embodiments of the disclosed apparatus, the processor is configured for providing a gimbal direction relative to a travel direction of the mobile platform.

In some embodiments of the disclosed apparatus, the processor is configured for providing a pitch of a gimbal on the mobile platform.

In some embodiments of the disclosed apparatus, the processor is further configured for generating a remote control command according to an input from a user; and
  the transceiver is further configured for sending the remote control command to the mobile platform for remotely controlling the mobile platform.

In some embodiments of the disclosed apparatus, the processor is further configured for generating remote control data according to the remote control command.

In some embodiments of the disclosed apparatus, the processor is configured for collecting the remote control data.

In some embodiments of the disclosed apparatus, the transceiver is configured for sending the remote control command to the mobile platform, the remote control command includes a platform movement command, and the integration includes detecting an inconsistency between a movement of the mobile platform and the platform movement command.

In some embodiments of the disclosed apparatus, the transceiver is configured for collecting the diagnostic data associated with the mobile platform, wherein the diagnostic data includes remote control operation data from a remote controller of the mobile platform.

In some embodiments of the disclosed apparatus, the transceiver is configured for collecting the diagnostic data associated with the mobile platform, wherein the diagnostic data includes location data from a remote controller of the mobile platform.

In some embodiments of the disclosed apparatus, the transceiver is configured for collecting the diagnostic data associated with the mobile platform, wherein the diagnostic data includes GPS data from the remote controller of the mobile platform.

In some embodiments of the disclosed apparatus, the processor is configured for detecting an inconsistency between a movement of the mobile platform and a platform movement command provided by the remote controller.

In some embodiments of the disclosed apparatus, the processor is configured for integrating the travel route data with the diagnostic data for presentation in real time with the operation.

In some embodiments of the disclosed apparatus, the transceiver is configured for collecting the diagnostic data associated with the mobile platform, wherein the diagnostic data includes a battery voltage level from the mobile platform.

In some embodiments of the disclosed apparatus, the transceiver is configured for collecting the diagnostic data associated with the mobile platform, wherein the diagnostic data includes a battery current level from the mobile platform.

In some embodiments of the disclosed apparatus, the transceiver is configured for collecting the diagnostic data associated with the mobile platform, wherein the diagnostic data includes smart battery data from the mobile platform.

In some embodiments of the disclosed apparatus, the processor is configured for calculating a threshold battery power needed for returning to a home point according to a distance between the home point and the mobile platform, and generating a battery power alert when battery power reaches the threshold battery power.

In some embodiments of the disclosed apparatus, wherein the transceiver is configured for collecting the diagnostic data associated with the mobile platform, wherein the diagnostic data includes camera data from the mobile platform.

In some embodiments of the disclosed apparatus, the transceiver is configured for collecting the camera data, wherein the camera data includes a shutter speed, an International Standards Organization (ISO) sensitivity setting, and an aperture size.

In some embodiments of the disclosed apparatus, the transceiver is configured for providing a location of the mobile platform at a time of acquiring an image.

In some embodiments of the disclosed apparatus, the transceiver is configured for providing location of the mobile platform at a time of starting recording a video and at a time of stopping recording the video.

In some embodiments of the disclosed apparatus, the transceiver is configured for collecting the diagnostic data associated with the mobile platform, wherein the diagnostic data includes home point data from the mobile platform.

In some embodiments of the disclosed apparatus, the processor is configured for providing a home point of the mobile platform.

In some embodiments of the disclosed apparatus, the processor is configured for providing a direction of the mobile platform relative to a travel direction of the mobile platform.

In some embodiments of the disclosed apparatus, the transceiver is configured for collecting the diagnostic data associated with the mobile platform, wherein the diagnostic data includes a travel warning for the operation of the mobile platform.

In some embodiments of the disclosed apparatus, the transceiver is configured for receiving the diagnostic data and the travel route data at a predetermined time, and the apparatus includes a memory for storing the diagnostic data and the travel route data chronologically.

In some embodiments of the disclosed apparatus, the memory is configured for associating the diagnostic data and the travel route data with a time stamp.

In some embodiments of the disclosed apparatus, the processor is configured for integrating the travel route data in synchronization with the diagnostics data.

In some embodiments of the disclosed apparatus, the processor is configured for estimating a crash location of the mobile platform after ground communication with the mobile platform is lost.

In some embodiments of the disclosed apparatus, the collecting includes collecting the diagnostic data and travel route data to be downloaded.

In accordance with another aspect disclosed herein, there is set forth a method for providing operational information of a mobile platform, the method including:

collecting platform diagnostic data and travel route data associated with an operation of the mobile platform; and pushing the platform diagnostic data and the travel route data to a remote computer device, for integration of the pushed travel route data with the pushed platform diagnostic data for presentation.

In some embodiments of the disclosed method, the collecting includes collecting the platform diagnostic data and the travel route data associated with an unmanned aerial vehicle (UAV).

In some embodiments of the disclosed method, the pushing includes pushing the platform diagnostic data to the computer device, wherein the platform diagnostic data includes gimbal data.

In some embodiments of the disclosed method, the collecting includes collecting the gimbal data from the mobile platform, wherein the gimbal data includes an absolute coordinate of a gimbal associated with the mobile platform, a range of a gimbal angle of the gimbal, and an angle between a gimbal direction and a direction of the mobile platform.

In some embodiments of the disclosed method, the integration includes providing a gimbal direction relative to a travel direction of the mobile platform.

In some embodiments of the disclosed method, the integration includes providing a pitch of a gimbal on the mobile platform.

In some embodiments of the disclosed method, the integration includes integration of the travel route data with the platform diagnostic data for presentation in real time with the operation.

In some embodiments of the disclosed method, the pushing includes pushing the platform diagnostic data to the computer device, the platform diagnostic data including a battery voltage level.

In some embodiments of the disclosed method, the pushing includes pushing the platform diagnostic data to the computer device, the platform diagnostic data including a battery current level.

In some embodiments of the disclosed method, the pushing includes pushing the platform diagnostic data to the computer device, wherein the platform diagnostic data includes smart battery data.

In some embodiments of the disclosed method, the integrating includes calculating a threshold battery power needed for returning to a home point according to a distance between the home point and the mobile platform, and generating a battery power alert when battery power reaches the threshold battery power.

In some embodiments of the disclosed method, the pushing includes pushing the platform diagnostic data to the computer device, wherein the platform diagnostic data includes camera data.

In some embodiments of the disclosed method, the collecting includes collecting the camera data, wherein the camera data includes a shutter speed, an International Standards Organization (ISO) sensitivity setting, and an aperture size.

In some embodiments of the disclosed method, the integrating includes providing a location of the mobile platform at a time of acquiring an image.

In some embodiments of the disclosed method, the integrating includes providing location of the mobile platform at a time of starting recording a video and at a time of stopping recording the video.

In some embodiments of the disclosed method, the pushing includes pushing the platform diagnostic data to the computer device, wherein the platform diagnostic data includes home point data.

In some embodiments of the disclosed method, the integration includes providing a home point of the mobile platform.

In some embodiments of the disclosed method, the integrating includes providing a direction of the mobile platform relative to a travel direction of the mobile platform.

In some embodiments of the disclosed method, the pushing includes pushing the diagnostic data and the travel route data to the computer device at a predetermined time, for subsequently storing the diagnostic data and the travel route data chronologically.

In some embodiments of the disclosed method, the subsequent storing includes associating the diagnostic data and the travel route data with a time stamp.

In some embodiments of the disclosed method, the integration includes integration of the travel route data in synchronization with the platform diagnostics data.

In some embodiments of the disclosed method, the integration includes estimating a crash location of the mobile platform after ground communication with the mobile platform is lost.

In some embodiments of the disclosed method, the collecting includes collecting the diagnostic data and travel route data to be downloaded.

In some embodiments of the disclosed method, the collecting includes collecting a remote control command from the computer device for controlling the mobile platform.

In some embodiments of the disclosed method, the integration includes detecting an inconsistency between a movement of the mobile platform and a platform movement command provided by the computer device.

In accordance with a first aspect disclosed herein, there is set forth a mobile platform, the mobile platform including:

a processor for collecting platform diagnostic data and travel route data associated with an operation of the mobile platform; and a transmitter for pushing the platform diagnostic data and the travel route data to a remote computer device, for integration of the pushed travel route data with the pushed platform diagnostic data for presentation.

In some embodiments of the disclosed mobile platform, the mobile platform is an unmanned aerial vehicle (UAV).

In some embodiments of the disclosed mobile platform, the transmitter is configured for pushing the platform diagnostic data to the computer device, wherein the platform diagnostic data includes gimbal data.

In some embodiments of the disclosed mobile platform, the processor is configured for collecting the gimbal data from the mobile platform, wherein the gimbal data includes an absolute coordinate of a gimbal associated with the mobile platform, a range of a gimbal angle of the gimbal, and an angle between a gimbal direction and a direction of the mobile platform.

In some embodiments of the disclosed mobile platform, the transmitter is configured for pushing the diagnostic data and the travel route data to the computer device for providing a gimbal direction relative to a travel direction of the mobile platform.

In some embodiments of the disclosed mobile platform, the transmitter is configured for pushing the diagnostic data and the travel route data to the computer device for providing a pitch of a gimbal on the mobile platform.

In some embodiments of the disclosed mobile platform, the transmitter is configured for pushing the platform diagnostic data and the travel route data to the computer device, for integration of the travel route data with the platform diagnostic data for presentation in real time with the operation.

In some embodiments of the disclosed mobile platform, the transmitter is configured for pushing the platform diagnostic data to the computer device, wherein the platform diagnostic data includes a battery voltage level.

In some embodiments of the disclosed mobile platform, the transmitter is configured for pushing the platform diagnostic data to the computer device, wherein the platform diagnostic data includes a battery current level.

In some embodiments of the disclosed mobile platform, the transmitter is configured for pushing the platform diagnostic data to the computer device, wherein the platform diagnostic data includes smart battery data.

In some embodiments of the disclosed mobile platform, the integration includes calculating a threshold battery power needed for returning to a home point according to a distance between the home point and the mobile platform, and generating a battery power alert when battery power reaches the threshold battery power.

In some embodiments of the disclosed mobile platform, the transmitter is configured for pushing the platform diagnostic data to the computer device, wherein the platform diagnostic data includes camera data.

In some embodiments of the disclosed mobile platform, the transmitter is configured for pushing the camera data to the computer device, wherein the camera data includes a shutter speed, an International Standards Organization (ISO) sensitivity setting, and an aperture size.

In some embodiments of the disclosed mobile platform, the integration includes providing a location of the mobile platform at a time of acquiring an image.

In some embodiments of the disclosed mobile platform, the integration includes providing location of the mobile platform at a time of starting recording a video and at a time of stopping recording the video.

In some embodiments of the disclosed mobile platform, the transmitter is configured for pushing the platform diagnostic data to the computer device, wherein the platform diagnostic data includes home point data.

In some embodiments of the disclosed mobile platform, the integration includes providing a home point of the mobile platform.

In some embodiments of the disclosed mobile platform, the integrating includes providing a direction of the mobile platform relative to a travel direction of the mobile platform.

In some embodiments of the disclosed mobile platform, the transmitter is configured for pushing the diagnostic data and the travel route data to the computer device at a predetermined time, for subsequently storing the diagnostic data and the travel route data chronologically.

In some embodiments of the disclosed mobile platform, the subsequent storing includes associating the diagnostic data and the travel route data with a time stamp.

In some embodiments of the disclosed mobile platform, the transmitter is configured for pushing the diagnostic data and the travel route data to the computer device for integrating the travel route data in synchronization with the platform diagnostics data.

In some embodiments of the disclosed mobile platform, the transmitter is configured for pushing the diagnostic data and the travel route data to the computer device for estimating a crash location of the mobile platform after ground communication with the mobile platform is lost.

In some embodiments of the disclosed mobile platform, the transmitter is configured for pushing the diagnostic data and the travel route data to be subsequently downloaded.

In some embodiments of the disclosed mobile platform, the transmitter is configured for pushing the diagnostic data and the travel route data to the computer device for detecting an inconsistency between a movement of the mobile platform and a platform movement command provided by the computer device.

In some embodiments of the disclosed mobile platform, the transmitter is configured for pushing the diagnostic data and the travel route data to the computer device for detecting an inconsistency between a movement of the mobile platform and a platform movement command provided by a remote controller of the mobile platform.

In accordance with another aspect disclosed herein, there is set forth a method for providing operational information of a mobile platform, the method including:

collecting remote control data associated with a remote controller of the mobile platform and with an operation of the mobile platform; and pushing the remote control data to a computer device, for integration of the pushed remote control data with platform diagnostic data and travel route data associated with the mobile platform for presentation.

In some embodiments of the disclosed method, the collecting includes collecting the remote control data associated with the remote controller of a UAV.

In some embodiments of the disclosed method, the pushing includes pushing the remote control data to the display, the display is integrated on a computer device, and the remote controller is not integrated on the computer device.

In some embodiments of the disclosed method, the pushing includes pushing the remote control data to the display, and the display and the remote controller are integrated on a computer device.

In some embodiments of the disclosed method, the pushing includes pushing the remote control data to the display, and the display is integrated on the remote controller.

In some embodiments of the disclosed method, the integrating includes integration of the remote control data with the platform diagnostic data and the travel route data associated with the mobile platform for presentation in real time with the operation.

In some embodiments of the disclosed method, the pushing includes pushing the remote control data to the computer device, wherein the remote control data includes location data associated with the remote controller.

In some embodiments of the disclosed method, the pushing includes pushing the remote control data to the computer device, the remote control data including GPS data associated with the remote controller.

In some embodiments of the disclosed method, the pushing includes pushing the remote control data to the computer device, wherein the remote control data includes remote control operation data associated with the remote controller.

In some embodiments of the disclosed method, the pushing includes pushing the remote control data at a predetermined time, for subsequently storing the remote control data, the platform diagnostic data, and the travel route data chronologically.

In some embodiments of the disclosed method, the subsequent storing includes associating the remote control data, the platform diagnostic data, and the travel route data with a time stamp.

In some embodiments of the disclosed method, the integration includes integration of the travel route data in synchronization with the platform diagnostics data and the remote control diagnostic data.

In some embodiments of the disclosed method, the integration includes estimating a crash location of the mobile platform after ground communication with the mobile platform is lost.

In some embodiments of the disclosed method, the integration includes detecting an inconsistency between a movement of the mobile platform and a platform movement command provided by the remote controller.

In accordance with another aspect disclosed herein, there is set forth a remote controller of a mobile platform, the remote controller including:

a processor for collecting remote control data associated with an operation of the mobile platform; and a transmitter for pushing the remote control data to a computer device, for integration of the pushed remote control data with platform diagnostic data and travel route data associated with the mobile platform for presentation.

In some embodiments of the remote controller, the remote controller includes the remote controller of a UAV.

In some embodiments of the remote controller, the display is integrated on a computer device, and the remote controller is not integrated on the computer device.

In some embodiments of the remote controller, the display and the remote controller are integrated on a computer device.

In some embodiments of the remote controller, the display is integrated on the remote controller.

In some embodiments of the remote controller, the transmitter is configured for pushing the remote control data to the computer device, for integration of the remote control data with the platform diagnostic data and the travel route data associated with the mobile platform for presentation in real time with the operation.

In some embodiments of the remote controller, the transmitter is configured for pushing the remote control data to the computer device, the remote control data including location data of the remote controller.

In some embodiments of the remote controller, the transmitter is configured for pushing the remote control data to the computer device, the remote control data including GPS data of the remote controller.

In some embodiments of the remote controller, the transmitter is configured for pushing the remote control data to the computer device, the remote control data including remote control operation of the remote controller.

In some embodiments of the remote controller, the transmitter is configured for pushing the remote control data at a predetermined time, for subsequently storing the remote control data, the platform diagnostic data, and the travel route data chronologically.

In some embodiments of the remote controller, the subsequent storing includes associating the remote control data, the platform diagnostic data, and the travel route data with a time stamp.

In some embodiments of the remote controller, the transmitter is configured for pushing the remote control data to the computer device for integrating the travel route data in synchronization with the platform diagnostics data and the remote control data.

In some embodiments of the remote controller, the transmitter is configured for pushing the remote control data to the computer device for estimating a crash location of the mobile platform after ground communication with the mobile platform is lost.

In some embodiments of the remote controller, the transmitter is configured for pushing the remote control data to the computer device for detecting an inconsistency between a movement of the mobile platform and a platform movement command provided by the remote controller.

BRIEF DESCRIPTION OF THE DRAWINGS

FIG. 10 is an exemplary presentation for displaying operations in accordance with the method of FIG. 2.

Figure 1A:
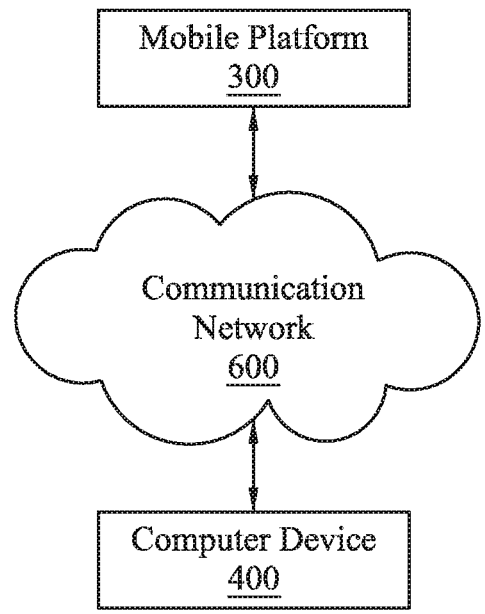
FIG. 1A is a top level block diagram illustrating an embodiment of a system for presenting operational information of a mobile platform.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Operations associated with current mobile platforms cannot be analyzed with desired efficiency and accuracy. Therefore, methods, devices, and systems for presenting operational information of an operation of a mobile platform, may provide essential tools for meeting a wide range of needs associated with mobile platform applications, e.g., troubleshooting an operation, locating a lost mobile platform, and extracting data acquired by a functional payload on the mobile platform.

Further, the disclosed methods, devices and systems are directed toward providing solutions to the technical problems of improving analysis of an operation of a mobile platform to facilitate general users' self-helped diagnosis of problems of the operation and further contribute to advancement of mobile platform technology as well as computer device technology.

The effects described as above can be accomplished according to an embodiment disclosed herein, by a system for presenting operational information of a mobile platform 100 as illustrated in FIG. 1A.

FIG. 1A is a top level block diagram illustrating an embodiment of a system for presenting operational information of a mobile platform. The system 100A of FIG. 1A is shown as including a mobile platform 300 and a computer device 400. The mobile platform 300 and the computer device 400 can communicate with each other via a communication network 600.

The mobile platform 300 may refer to any appropriate apparatus that is capable of moving over a distance. Exemplary mobile platforms can include, but are not limited to, automobiles, busses, trains, aircraft, ships and other types of vehicles. For illustrative purposes, the mobile platform can include an Unmanned Aerial Vehicle (UAV), and an operation may include a flight. However, wherever a UAV is described in the disclosed methods, devices and systems, the UAV may be replaced by another appropriate mobile platform, and a flight may be replaced by another operation associated with a mobile platform, without deviating from the concept covered in the scope of the present disclosure.

The computer device 400 may refer to a device configured for a programmable electronic device configured to receive data, perform computations and display the results of the computations. Embodiments of the computer device 400 and associated processes using the computer device 400 are described further below.

The communication network 600 can include a conventional wired and/or wireless communication network.

Figure 1B:
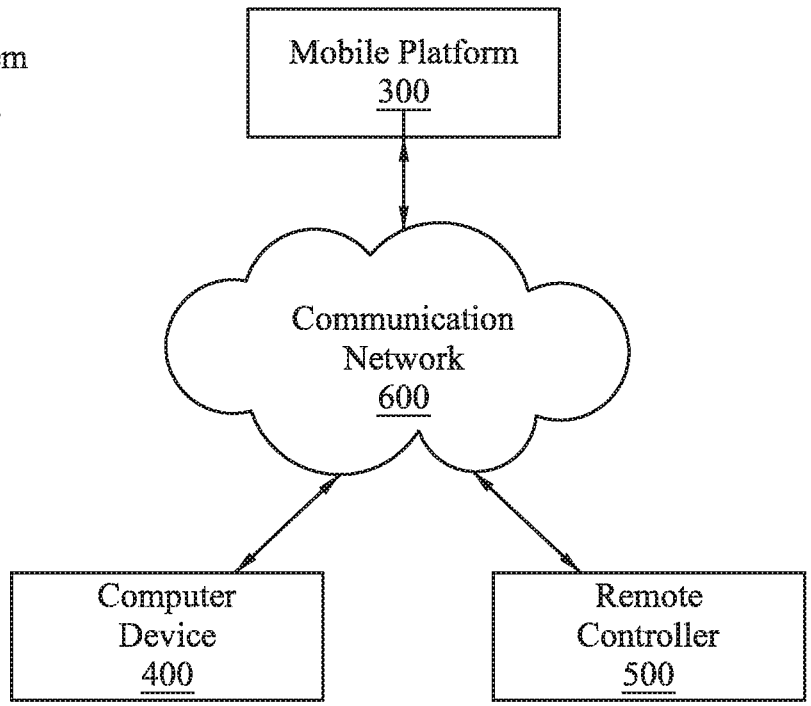
FIG. 1B is a block diagram illustrating another embodiment of the system of FIG. 1A for presenting operational information of a mobile platform.

FIG. 1B is a block diagram illustrating a system 100B. The system 100B is another embodiment of the system as illustrated in FIG. 1A for presenting operational information of a mobile platform. The system 100B is shown as including the mobile platform 300, the computer device 400 and a remote controller 500. The mobile platform 300, the computer device 400 and a remote controller 500 can communicate with each other via the communication network 600.

Communication technology used for communication between any two of the mobile platform 300, the computer device 400, and the remote control 500 may be the same and/or different. For example, the mobile platform 300 may communicate with both of remote control 500 and the computer device 400 wirelessly, and communication between the remote control 500 and the computer device 400 may be wired or wireless.

Further, communication between any two of the mobile platform 300, the computer device 400, and the remote control 500 may be either direct or indirect, without limitation. For example, the remote control 500 can send data to the computer device 400. The computer device 400 can then forward the data to the mobile platform 300.

Any conventional communication technology may be used for establishing the communication network 600, without limitation. For example, wired communication technology may include telephone networks, cable television or internet access, and fiber-optic communication. Suitable wireless communication methods include, for example, radio, Wireless Fidelity (Wi-Fi), cellular, satellite, and broadcasting. Each of the mobile platform 300, the remote control 500 and the computer device 400 may respectively include a transceiver. In various embodiments, when a transceiver is configured to transmit signals, "transceiver" may be used interchangeably with "transmitter".

The transceiver may include an appropriate RF (radio frequency) circuitry to receive and send RF signals, or any other software/hardware for communication. An RF circuitry may include any appropriate circuitry for performing communication functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may communicate with networks, such as the Internet, also referred to as the World Wide Web (WWW), an intranet and/or a wireless network, such as a cellular telephone network, a LAN and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this disclosure.

Although shown and described with reference to FIGS. 1A-1B as including one mobile platform 300 and one computer device 400, and shown and described with reference to FIG. 1B as including one remote controller 500 for purpose of illustration only, any appropriate number of mobile platforms 300, computer devices 400 and remote controllers 500 may be included in the system 100, without deviating from the disclosed concept. For example, one computer device 400 may be configured to collect data from multiple mobile platforms 300, and/or one mobile platform 300 may be configured to push data to multiple computer devices 400.

Figure 2:
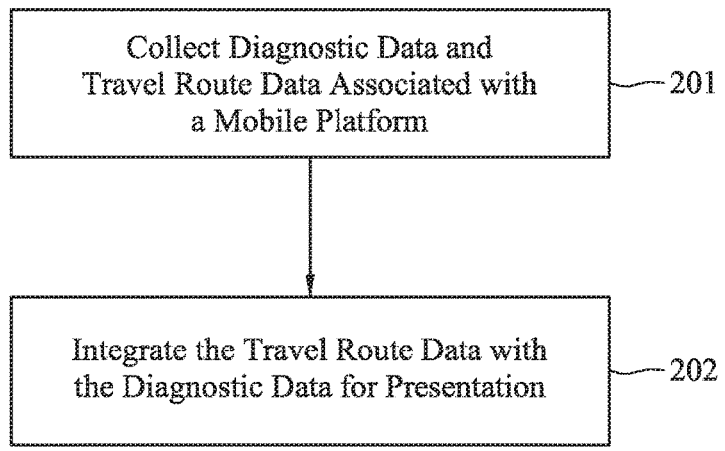
FIG. 2 is a top level flow chart illustrating an embodiment of a method for presenting operational information of the mobile platform of FIGS. 1A-1B.

FIG. 2 is a flow chart illustrating an exemplary method 200 for presenting operational information of the mobile platform 300 (shown in FIG. 1A-1B). In certain embodiments, the method 200 as depicted in FIG. 2 may be used presenting operational information of a UAV. The disclosed method 200 can be implemented on the computer device 400 (shown in FIGS. 1A-1B). In the system 100A of FIG. 1A, the mobile platform 300 can be configured correspondingly for the computer device 400 to accomplish the functions and features for presenting operational information of the mobile platform 300. In the system 100B of FIG. 1B, the mobile platform 300 and the remote controller 500 can be configured correspondingly for the computer device 400 to accomplish the functions and features for presenting operational information of the mobile platform 300.

As shown in FIG. 2, diagnostic data and travel route data associated with the mobile platform during operation are collected at 201. The travel route data is integrated, at 502, with the diagnostic data for presentation. Embodiments of the method 200 and associated structures of apparatus for implementing the method 200 are described further below.

Figure 3:
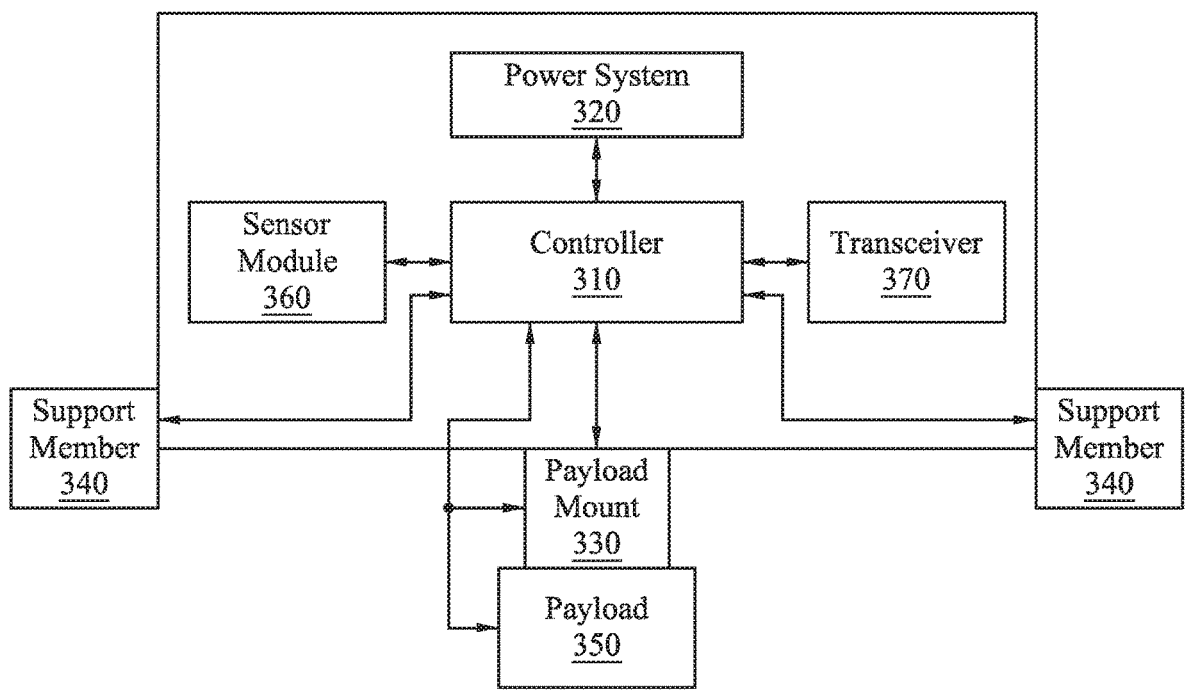
FIG. 3 is a block diagram illustrating an embodiment of the mobile platform of FIGS. 1A-1B.

FIG. 3 illustrates an embodiment of the mobile platform 300 of FIGS. 1A-1B. The exemplary mobile platform 300 can include a controller 310. The controller 310 can include processing hardware for performing data acquisition, data processing, and any other functions and operations described herein for controlling an operation of the mobile platform 300. Without limitation, the controller 310 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. In various embodiments, the controller 310 can include a processor for performing a portion of, or all of, the disclosed functions of the controller 310.

Additionally and/or alternatively, the mobile platform 300 can include a transceiver 370, which can include RF circuitry or any other appropriate hardware and any appropriate software instructing the hardware for receiving and/or transmitting data. In various embodiments, the transceiver 214 can be configured to push data from the controller 202 to the computer device 106 (shown in FIG. 1).

Additionally and/or alternatively, the mobile platform 300 can include a sensor module 360. The controller 310 can communicate with the sensor module 370. The sensor module 370 can include one or more sensors (not shown) including, but not limited to, a location data unit, an odometer, an inertial measurement unit, an accelerometer, and the like. By obtaining data from the sensors and processing the data, the controller 310 can obtain travel route data of the mobile platform 300. The travel route data can include any information associated with location, orientation, and movement of the mobile platform at various times during the operation. Exemplary travel route data can include a geographic location, a vertical speed, a horizontal speed, an altitude, a travel direction, a tilt angle, and the like for the mobile platform 300.

Further, the controller 310 can record home point data associated with the mobile platform 300. The home point data can include information associated with a home point of the operation of the mobile platform 300. The home point can refer to a location where the operation starts, a location of the computer device 400, a location of the remote controller 500, and/or a desired location specified by the user for a certain purpose.

Still further, the controller 310 can be configured to receive location data of the remote controller 500 and/or the computer device 400, and various operation commands from the remote controller 104 and/or the computer device 400 (as shown in FIGS. 1A-1B). The location data can include GPS positioning information.

Additionally and/or alternatively, the mobile platform 300 may also include a power system 320 for powering various components of the mobile platform 300. The power system 320 may include one or more power sources (e.g., battery, alternating current (AC)), and any other appropriate optional components, e.g., a power management system, a recharging system, a power failure detection circuit, a power converter or inverter, a power status indicator (e.g., a light-emitting diode (LED)), and any other components associated with the generation, management and distribution of power in the mobile platform 300.

In one embodiment, the power system 320 can include a battery (not shown). The battery can include any appropriate array or matrix of sub-units and can be made using any appropriate battery technologies. The battery can be configured to provide battery hardware data to the controller 310. At any time during the operation of the mobile platform, the battery hardware data can include battery voltage level, battery current level, or any other appropriate electrical parameters indicating remaining capacity or power of the battery.

The power system 320 can transmit the battery hardware data to the controller 310. The controller 310 can be configured to calculate smart battery data based on the battery hardware data. The smart battery data can include any appropriate information that can associate the state of the battery with a parameter or action of the mobile platform operation. For example, the smart battery data may include remaining battery life, remaining travel time, a travel distance that the mobile platform may complete before exhausting battery power, and/or a threshold distance from a home point or a starting point of the trip at which the mobile platform needs to start a return trip in order to have sufficient battery power to reach the home point. The controller 310 may use any conventional processes for calculating the smart battery data. For example, the controller 310 can calculate percentage of remaining battery power by comparing the battery voltage level with a battery voltage level of a fully charged battery. By knowing the remaining battery power, a speed of the mobile platform 300, and power consumption per unit time corresponding to the speed, the controller can calculate duration of operation and distance of travel that can be completed before exhausting the battery power.

Additionally and/or alternatively, the mobile platform 300 may also include a payload mount 330. The payload mount 330 may include one or more gimbals, or any other appropriate structure.

Additionally and/or alternatively, the mobile platform 300 may also include a payload 350. The payload 350 may be removably/temporarily mounted on the mobile platform via the payload mount 330. The payload mount 330 can be configured to move relative to the mobile platform to allow a movement of the payload 210.

The controller 310 can be configured to manipulate the payload mount 330 to a desired position autonomously or according to instructions from the computer device 400 and/or the remote controller 500. The payload mount 330 can provide the controller 310 with orientation (e.g., angles and/or coordinates) of the payload mount 330. The controller 310 can be configured to perform calculations based on the orientation of the payload mount 330 and the posture (e.g., angles and/or coordinates) of the mobile platform 300. The results of the calculations are generated by the controller 310 as payload mount data. The payload mount data can include the coordinates of the payload mount 330 relative to the mobile platform 300, or absolute coordinates of the payload mount 330.

Alternatively, the payload mount 330 may include a built-in processor. In that case, the payload mount 330 can obtain the posture of the mobile platform 300 from the controller 310. Based on the orientation of the payload mount 330 and the posture of the mobile platform 300, the payload mount 330 can perform calculations to generate the payload mount data.

When the payload mount 330 includes a gimbal, the payload mount data can include gimbal data. The gimbal data may include angles (or coordinates) of the payload mount 330 with respect to yaw axis, roll axis and pitch axis, also referred to as gimbal yaw, gimbal roll, and gimbal pitch, respectively. A gimbal direction may include values of angles or coordinates for specifying a direction that the payload 350 faces. The gimbal data can include the direction of the gimbal relative to a facing direction or travel direction of the mobile platform 300, and/or absolute angles of the gimbal. The gimbal data can further include collective information including a range of the angles with respective to each axis during an operation or multiple operations.

The payload 350 can include any appropriate apparatus for carrying out a desired function. The payload 350 can include, e.g., a payload camera (or camera), a camera lens of a payload camera, a telescope, a sensor, an illuminator, and the like.

When the payload 350 includes a camera lens, the payload mount data can include the horizontal facing of the camera lens, i.e., gimbal yaw, and a degree of looking toward the ground/sky of the camera lens, i.e., gimbal pitch.

Further, the payload 350 can provide payload data to the controller 310. When the payload 350 includes a camera or a camera lens of a camera, the "payload data" can include "camera data". For example, the camera data can include any parameters associated with settings of the camera, i.e., still images, video images, shutter speed, International Standards Organization (ISO) sensitivity setting of the camera, aperture size. The camera data can further include time of acquiring an image, length of a video, time of starting and/or ending a video, camera mode or programming information.

The mobile platform 300 can further include one or more support members 340. The support members 340 may be configured to be adjusted into a selected position at each stage of the operation. For example, the support member 340 may be adjusted toward a landing surface (not shown) for supporting the mobile platform 300 when the mobile platform 300 lands and may be adjusted away from the landing surface during travel so as not to obstruct operation of the payload 350. The controller 310 can be configured to control the adjustment of the support member 340. The controller 310 can calculate and store the support member data. The support member data can include information of positions of the support member 340 at each stage of the operation. The support member data can include, e.g., a name of a position, a geometric parameter representing the position of the support member 340 such as a pivot angle, a height of a terminal of the support member with respect to a component of the mobile platform 300.

The components of mobile platform 300 as illustrated in FIG. 3 are exemplary only. Other components (e.g., motor) may be included. The controller 310 can be configured to receive data from at least a selected portion or all of the components of the mobile platform 300, process the data and store the data for pushing to the computer device 400 and/or the remote controller 500.

Figure 4:
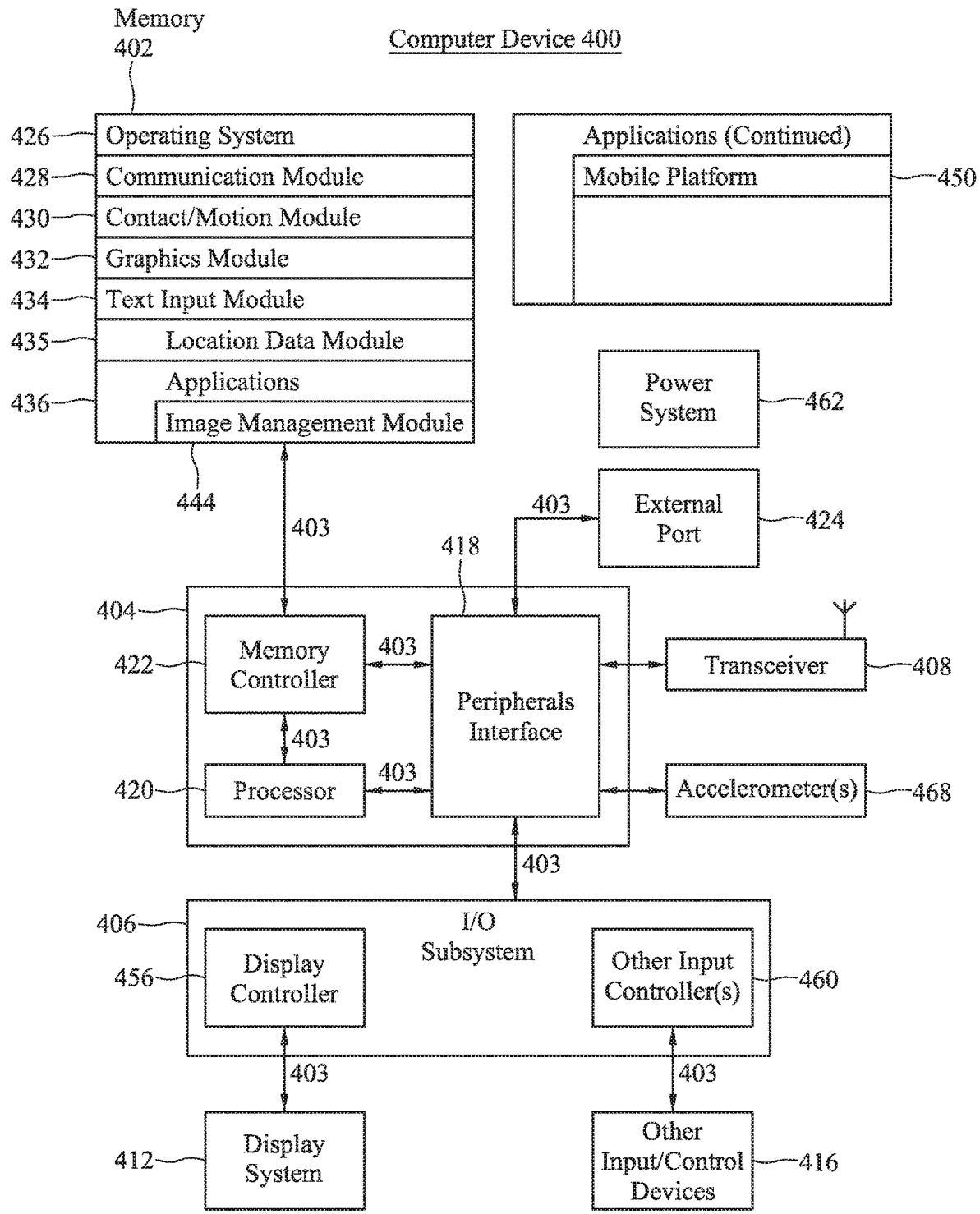
FIG. 4 is a block diagram illustrating an embodiment of the computer device of FIGS. 1A-1B.

FIG. 4 is a block diagram illustrating an embodiment of the computer device 400 of FIGS. 1A-1B. As shown in FIG. 4, the computer device 400 may include a memory 402 (which may include one or more computer readable storage mediums), a memory controller 422, one or more processors (CPUs) 420, a peripherals interface 418, RF circuitry (or transceiver) 408, an input/output (I/O) subsystem 406, other input or control devices 416, and an external communication port 424, which can communicate with each other over one or more communication buses or signal lines 403.

The computer device 400 may include a display system 412. In certain embodiments, the display system 412 can include a touch-sensitive display, which can also be called a "touch screen." It should be appreciated that the computer device 400 is only one example of a computer device suitable for use with the disclosed system 100, and that the computer device 400 may have more or fewer components than shown, may combine two or more components, or may have a different configuration or arrangement of the components. The various components shown in FIG. 4 may be implemented in hardware, software or a combination of both hardware and software, including one or more signal processing and/or application-specific integrated circuits.

The memory 402 may include high-speed random access memory (RAM) and may also include non-volatile memory, such as one or more magnetic disk storage devices, flash memory devices, or other non-volatile solid-state memory devices. Access to the memory 402 by other components of the computer device 400, such as the processor 420 and the peripherals interface 418, may be controlled by the memory controller 422.

The peripherals interface 418 couples input and output peripherals of the computer device 400 to the processor 420 and memory 402. The one or more processors 420 run or execute various software programs and/or sets of instructions stored in memory 402 to perform various functions for the computer device 400 and to process data.

In some embodiments, the peripherals interface 418, the processor 420, and the memory controller 422 may be implemented on a single chip, such as a chip 404. In some other embodiments, they may be implemented on separate chips.

The transceiver 408 receives and sends RF signals, also called electromagnetic signals. The transceiver 408 converts electrical signals to/from electromagnetic signals and communicates with the communications network 600 in FIGS. 1A-1B, the mobile platform 300 (shown in FIGS. 1A-1B), and the remote controller 500 (shown in FIG. 1B) via the electromagnetic signals.

The I/O subsystem 406 couples input/output peripherals on the computer device 400, such as the display system 412 and other input/control devices 416, to the peripherals interface 418. The I/O subsystem 406 may include a display controller 456 and one or more input controllers 460 for other input or control devices. The one or more input controllers 460 receive/send electrical signals from/to other input or control devices 416. The other input/control devices 416 may include physical buttons (e.g., push buttons, rocker buttons, etc.), dials, slider switches, joysticks, click wheels, and so forth. In some alternate embodiments, input controller(s) 460 may be coupled to any (or none) of the following: a keyboard, infrared port, USB port, and a pointer device such as a mouse.

When the display system 412 includes a touch screen, the touch screen can provide an input interface and an output interface between the device and a user. The display controller 456 receives and/or sends electrical signals from/to the touch screen. The touch screen can display visual output to the user. The visual output may include graphics, text, icons, video, and any combination thereof (collectively termed "graphics"). In some embodiments, some or all of the visual output may correspond to user-interface objects, further details of which are described below.

The display system 412 includes a display screen. The display screen is an area made using certain display technology to display visual content to a user. For example, the visual content can include content of a map. The display screen may be made using LCD (liquid crystal display) technology, OLED (organic light-emitting diode) technology or LPD (light emitting polymer display) technology, although any other appropriate display technologies may be used in other embodiments. When the display screen of the display system 412 includes a touch screen, the touch screen and the display controller 456 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen.

The computer device 400 also includes a power system 462 for powering the various components. The power system 462 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The computer device 400 may also include one or more accelerometers 468. FIG. 4 shows an accelerometer 468 coupled to the peripherals interface 418. Alternately, the accelerometer 468 may be coupled to an input controller 460 in the I/O subsystem 406. In some embodiments, information is displayed on the touch screen display in a portrait view or a landscape view based on an analysis of data received from the one or more accelerometers. The accelerometer 468 may further detect orientation of the computer device for calculating a direction that a user reading the computer device is facing.

In some embodiments, the software components stored in memory 402 may include an operating system 426, a communication module (or set of instructions) 428, a contact/motion module (or set of instructions) 430, a graphics module (or set of instructions) 432, a text input module (or set of instructions) 434, a location data module (or set of instructions) 435, and applications (or set of instructions) 436.

The operating system 426 (e.g., Darwin, RTXC, LINUX, UNIX, OS X, WINDOWS, Android, iOS, QNX, or an embedded operating system such as VxWorks) includes various software components and/or drivers for controlling and managing general system tasks (e.g., memory management, storage device control, power management, etc.) and facilitates communication between various hardware and software components.

The communication module 428 facilitates communication with other devices over one or more external communication ports 424 and also includes various software components for handling data received by the transceiver 408 and/or the external communication port 424. The external communication port 424 (e.g., Universal Serial Bus (USB), FIREWIRE, etc.) is adapted for coupling directly to other devices or indirectly over a network (e.g., the Internet, wireless LAN, etc.).

The contact/motion module 430 may detect contact with the touch screen (in conjunction with the display controller 456) and other touch sensitive devices (e.g., a touchpad or physical click wheel). The contact/motion module 430 includes various software components for performing various operations related to detection of contact, such as determining if contact has occurred, determining if there is movement of the contact and tracking the movement across the touch screen, and determining if the contact has been broken (i.e., if the contact has ceased). The graphics module 432 includes various known software components for rendering and displaying graphics on the touch screen, including components for changing the intensity of graphics that are displayed.

The text input module 434, which may be a component of graphics module 432, provides soft keyboards for entering text in various applications.

The location data module 435 determines the location of the device and provides this information for use in various applications. GPS or any other appropriate technologies may be used for determining the location of the device.

The applications 436 may include various modules (sets of instructions, or a subset or superset thereof). The modules can also be referred to as applications, or apps.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 402 may store a subset of the modules and data structures identified above. Furthermore, memory 402 may store additional modules and data structures not described above.

In various embodiments, the application 436 can include a mobile platform app 450. In conjunction with the transceiver 408, the processor 420, the display system 412, the display system controller 456, the contact module 430, the graphics module 432, and the text input module 434, the mobile platform app 450 may be used to for collecting data from a mobile platform and a remote controller associated with the mobile platform, for integrating the data for presentation. Embodiments of user interfaces and associated processes using the mobile platform app 450 are described further below.

Figure 5:
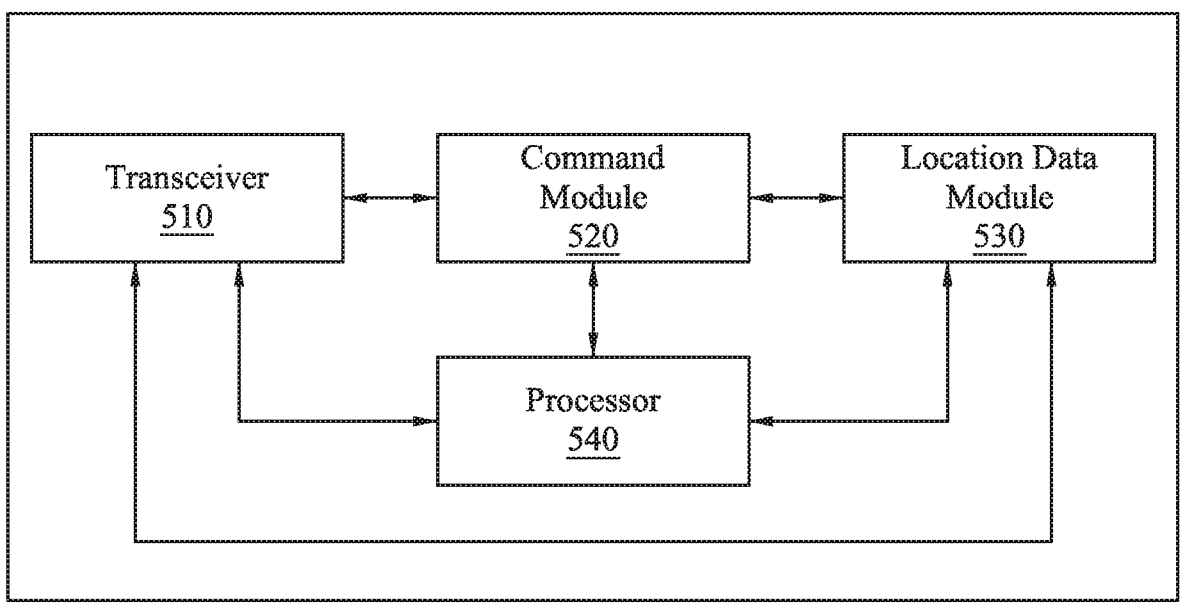
FIG. 5 is a block diagram illustrating an embodiment of the remote controller of FIG. 1B.

FIG. 5 illustrates an exemplary embodiment of the remote controller 500 of the mobile platform 300 (shown in FIG. 1B). The remote controller 500 can include a command module 520. The command module 520 can include various components to receive one or more operation commands from a user. The components can include joysticks, switches, keys or buttons, and the like. The operation commands can include movement commands or any other types of action commands, e.g., moving forward or backward, sideward flying, turning left or right, elevating or descending, throttle control, accelerating or decelerating, switching gear or mode, and the like. The operation commands can include any other appropriate operations the user performs on the remote controller 500. An operation command sent to the mobile platform 300 from the remote controller 500 can also be referred to as a "remote control operation command".

Additionally and/or alternatively, the remote controller 500 can include a location data module 530. The location data module 530 can be configured to provide location data associated with the remote controller 500. The location data can include location of the remote controller 500. In various embodiments, the location data module 506 can include a GPS module, and the location information of the remote controller 500 can include GPS data associated with the remote controller 500.

Additionally and/or alternatively, the remote controller 500 can include a processor 540. The processor 540 is configured to collect remote control data. The remote control data can include remote control operation data, the location data, and any other appropriate information associated with the remote controller 300. The remote control operation data can include information associated with the operation commands received from the user by the command module 520.

Additionally and/or alternatively, the remote controller 500 can include a transceiver 510. The transceiver 510 is configured to transmit operation commands wirelessly to the mobile platform 300, and hence, a user can control the mobile platform 300 from a remote location. In certain embodiments, the transceiver 510 can be configured to send the remote control data to the computer device 400. In certain embodiments, the transceiver 510 can be configured to receive certain data from the mobile platform 300 and forward the data to the computer device 400.

In various embodiments, the transceiver 510 is further configured to push the remote control data to a computer device, so that the remote control data can be integrated with other data collected by the computer device.

Referring back to FIG. 2, diagnostic data and travel route data associated with the mobile platform 300 during operation are collected at 501. The travel route data of the mobile platform 300, as previously described, can include any information indicating location and movement of the mobile platform at various times during an operation.

The diagnostic data can include platform diagnostic data and remote control data. Platform diagnostic data can include any data collected that are associated with any component on the mobile platform that is not included in the travel route data. The remote control data, as previously described, can include remote control operation data, remote control location data, and any other appropriate data associated with the remote controller.

Further, the diagnostic data can include computer device diagnostic data, also referred to as app diagnostic data. The app diagnostic data can include any appropriate data associated with the operation that is self-defined by the app. For example, when the user commands the camera to acquire an image, the app can be configured to generate a notification associated with such a command. Such a notification may further include camera setting parameters associated with the image acquired.

The computer device diagnostic data can further include an operation warning or an operation tip. The operation warning or operation tip can include any appropriate message and can be generated by the mobile platform, the remote controller or the computer device.

In one example, the computer device may detect the direction of the display screen of the computer and accordingly calculate a direction of the user may be facing. When the computer device integrates data of orientation of the computer device and the travel route data and determines that the mobile platform is behind the user, a corresponding travel warning may be generated.

In another example, when the mobile platform detects that an altitude limit or a distance limit has been reached during the operation, or interfering signal is received, the mobile platform can send a travel warning to the user. Alternatively, the computer device may generate such a travel warning by integrating available diagnostic data and travel route data.

The travel route data may be pushed from the mobile platform to the computer device 400, and stored on the memory 402. The memory 402 can store travel route data using any appropriate architecture and protocol, including, e.g., using a data architecture similar to an object storage device.

The platform diagnostic data can be pushed from the mobile platform to the computer device. The platform diagnostic data can include, e.g., home point data, payload mount data or gimbal data, payload data, support member data, battery hardware data, and smart battery data.

The remote control data can be pushed from the remote controller to the computer device. The remote control data can include, e.g., remote control operation data and remote control location data.

The diagnostic data and travel route data can be pushed to the computer device using any appropriate communication technology and protocol. As previously described, the platform diagnostic data can include multiple types of data. Each type of data may be associated with a specific component of the mobile platform, respectively. The controller may receive a first piece of data from a component, and may process the first piece of data to generate a second piece of data. The first piece of data and the second piece of data can become available at a certain frequency or randomly, according to communication frequency and protocol between the controller of the mobile platform and the component and according to the specific data processing sequence of the controller.

When new data is pushed to the computer device, the computer device may associate one or more time stamps to the data. For example, the time stamp can include a time when the data is pushed by the mobile platform or by the remote controller, a time when the data is received by the computer device, and/or a time when the data is created initially.

In certain embodiments, the data may be associated with a time stamp that is a time when the data is pushed by the mobile platform. In that case, the controller may need to be configured to receive data, process the data and push the data in a timely manner. Thus, when the computer device stores data in such a manner, the stored data in association with the time stamp may represent the status of the mobile platform with desired accuracy. The remote control data can be pushed from the remote controller to the computer device and be associated with a time stamp in a similar manner. In one embodiment, the computer device may associate the data with a time stamp that is a time when the data is pushed by the remote controller.

Figure 6:
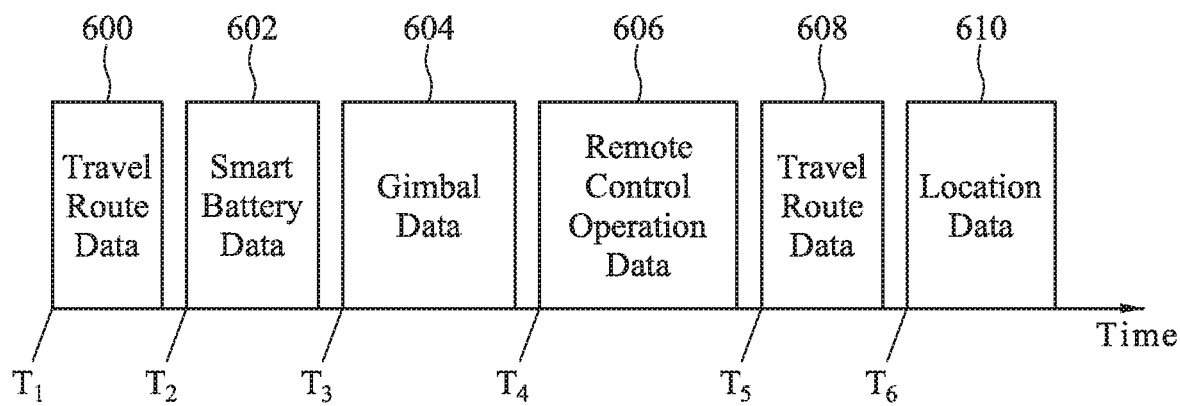
FIG. 6 is an exemplary schematic diagram illustrating pushing diagnostics data and travel route data in accordance with the method of FIG. 2.

FIG. 6 is an exemplary schematic diagram illustrating collecting diagnostics data and travel route data, at 501, in accordance with the method 200 (collectively shown in FIG. 2). As shown in FIG. 6, at time T1, a first piece of travel route data 600 is pushed to the computer device. At time T2, smart battery data 602 is pushed to the computer device. At time T3, gimbal data 604 is pushed to the computer device. At time T4, remote control operation data 606 is pushed to the computer device. At time T5, second piece of travel route data 608 is pushed to the computer device. At time T6, location data 610 of the remote controller is pushed to the computer device.

In FIG. 6, for illustrative purposes, a process of pushing data at each of T1, T2, T3, T4, T5 and T6 needs a duration of time to complete. The process of pushing data can be sufficiently fast that the duration of time that is needed can be very short. For example, data pushed at T1 may be completed before T2 starts.

In certain embodiments, travel route data may be pushed to the computer device regularly at predetermined frequency. For example, the frequency can range from 5 Hz to 15 Hz. When the frequency is 10 Hz, T5=T1+0.1 second.

In one embodiment, the computer device may associate with a piece of data with a time stamp that is a time when the data is actually pushed, thus data first piece of travel route data 600, smart battery data 602, gimbal data 604, remote control operation data 606, second piece of travel route data 608, and location data 610 may be associated with T1, T2, T3, T4, T5, and T6, respectively.

In another embodiment, the computer device may associate a piece of data with a time other than the time of generating the data or the time of pushing the data. For example, in FIG. 6, the travel route data may be pushed to the computer device regularly at a certain fixed frequency. The computer device may be configured to associate T5 as a time stamp with the smart battery data 602, the gimbal data 604 and the remote control operation data 606. The computer device may then record the smart battery data 602, the gimbal data 604 and the remote control operation data 606 as data pushed at T5. That is, the computer device may be configured to choose to use only time stamps of a first type of data for recording all types of data. When a second type of data is received between two time stamps of the first type of data, the second type of data may be associated with the time stamp of the first type of data that follows the receipt of the second type of data.

In certain embodiments, the computer device can store the received data according to the time stamp associated with the data.

In certain embodiments, the computer device can store the received data chronologically, but not necessarily associating a time stamp with the data. That is, the sequence of the data may be consistent with the time of pushing the data, but time stamp information may or may not be stored in association with the data.

Further, pushing the data to the computer device during the operation may not be essential. In certain embodiments, the data may be transferred to the computer device using any other appropriate methods, and may be transferred from the mobile platform and/or the remote controller after some or all of the data associated with the operation become available, e.g., after an operation is completed. In that case, for recording data with desired accuracy, data may be associated with a time when the data is generated or any other appropriate time stamp, instead of a time when the data is pushed.

In some embodiments, platform diagnostic data generated by each component is forwarded to the computer device by the controller of the mobile platform via the transceiver. However, in other embodiments, a component may include a transceiver, or may access the transceiver of the mobile platform directly without sending data to the controller first, the component may be configured to directly push certain data to the computer device. For example, the payload (e.g., the payload camera), the gimbal, and/or the camera may directly push data to the computer device. Data generated on those components can thus be sent to the computer device without being forwarded by the controller.

In certain other embodiments, a component may transmit data to another component that forwards the data to the computer device. For example, data generated by the payload camera may be transmitted to the gimbal, and the gimbal may forward the data to the computer device.

Referring back to FIG. 5, the travel route data is integrated, at 502, with the diagnostic data for presentation. In various embodiments, data are stored in association with a time stamp. Therefore, all types of data can be integrated according to the time stamp. In other words, various types of data collected by the computer device can be combined based on the time stamp of the data, and be presented in synchronization.

Figure 7:
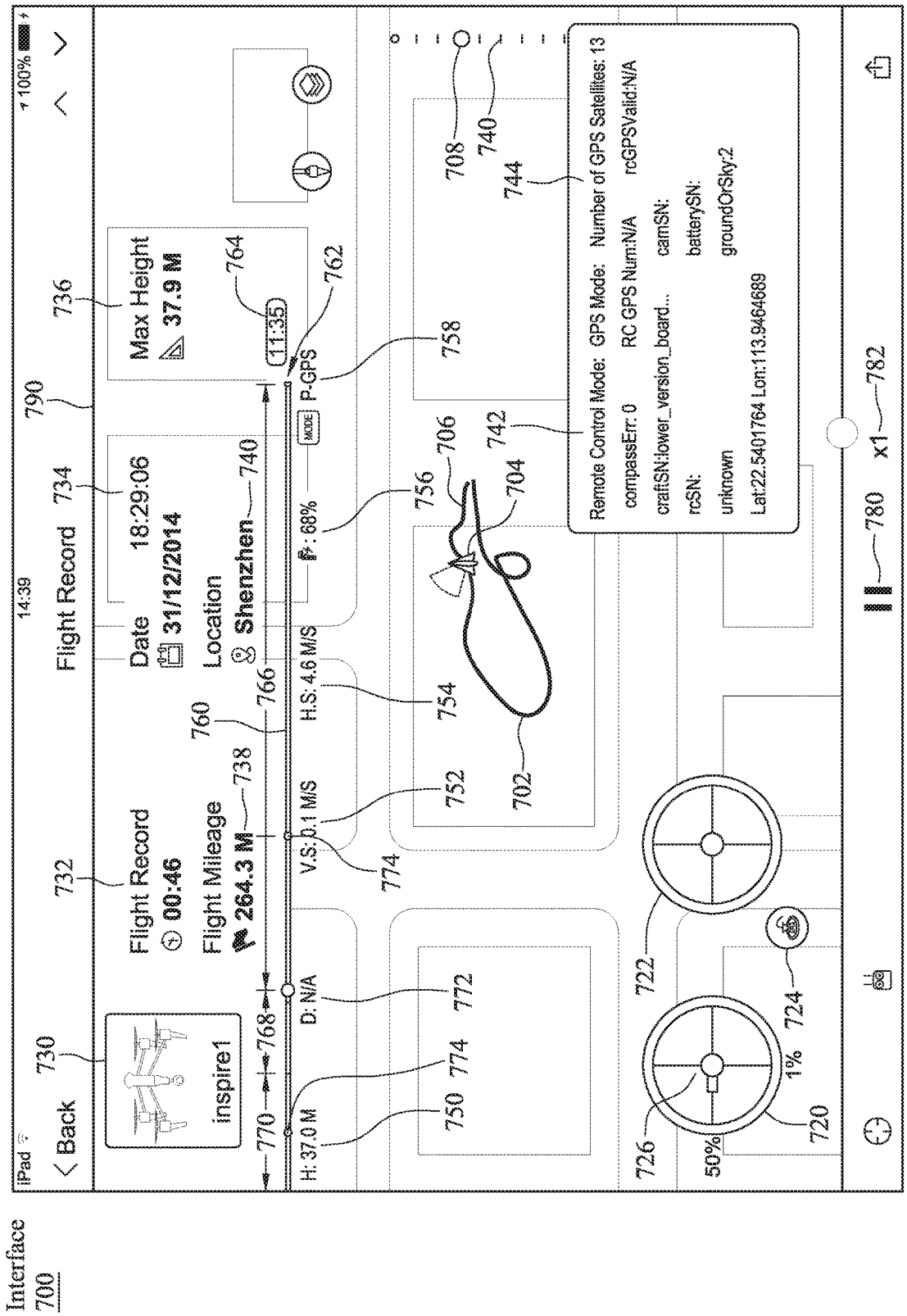
FIG. 7 is an exemplary presentation of travel route data integrated with diagnostic data in accordance with the method of FIG. 2.

In various embodiments, an operation of the mobile platform or mobile platform can be presented visually on a display of the computer device. FIG. 7 is an exemplary presentation of travel route data integrated with diagnostic data in accordance with the method of FIG. 2.

FIG. 7 illustrates an exemplary interface 700 displayed via the computer device. The interface 700 presents travel route data integrated with diagnostic data in accordance with the method of FIG. 2. As shown in FIG. 7, an interface 700 can present a travel route 702 of the mobile platform 300 (shown in FIGS. 1A-1B) as set forth on a map 790. The mobile platform 300 can be presented by an icon 704. The icon 704 can be so shaped as to indicate a travel direction of the mobile platform 300.

A gimbal direction can be indicated by a gimbal icon 706. In the example shown in FIG. 7, a camera lens may be mounted on the gimbal, and the gimbal icon can show that the camera lens is facing a different direction from the direction of the mobile platform 300.

Further, gimbal pitch and/or a gimbal roll can be presented. For example, in FIG. 7, a gimbal pitch indicator 708 can be shown on a gimbal pitch meter 710 to show the gimbal pitch. Thus, a user can visualize direction of the camera lens on the map in synchronization with movement of the mobile platform 300. The user may thus be able to accurately analyze contents in the acquired still and/or video images.

The interface 700 can visually present remote control data. In FIG. 7, the remote control data can be presented by depicting user operations on some or all components on the remote controller. A left joystick 720, a right joystick 722 and a home point button 724 are shown to represent corresponding components on the remote controller. For example, a horizontal bar 726 on the left joystick 720 can indicate that the user pulls the left joystick on the remote controller leftward. A length of the horizontal bar 726 can correspond to an amount of the leftward pull. Similarly, any other remote controller commands can be shown on the interface 700 by graphically simulating user commands on a control panel of the remote controller, without limitation.

As shown in FIG. 7, an interface 700 can depict a model of the mobile platform 730, a time 732 from a start of the operation, a date and time 734 of the operation, a maximum height (or maximum altitude) 736 reached during the operation, a mileage 738 of the operation, a location 740 of the operation, a location mode 742 associated with the remote controller, and a number of GPS satellites 744 for locating the remote controller or the mobile platform.

The interface 700 can further include a height (or altitude) 750, a vertical speed 752, a horizontal speed 754 and remaining battery power 756, and a location mode 758 associated with the mobile platform at a current location and a current time.

The interface 700 can further include a smart battery bar 760. The smart battery bar 760 can indicate battery status by calculations based on a home point, a location of the mobile platform and remaining battery power. In one example, the home point may be a location of the remote control or the location of the computer device, without limitation. As illustrated in FIG. 7, an end point 762 of the smart battery bar 760 represents a current status of the battery at a corresponding current time 764. When the end point 762 is within a first region 766 of the smart battery bar 760, the mobile platform 300 has sufficient battery power and does not need to return to the home point. With consumption of battery power, the smart battery bar 760 may reduce. When the end point 762 is within a second region 768 of the smart battery bar 760, i.e., passing the 'H' symbol 772, the mobile platform 300 need to return to the home point. When the end point 762 is within a third region 770 of the smart battery bar 760, the mobile platform may descend. Various points 774 may be marked on the smart battery bar 760, to indicate certain percentage of battery power that remain, and the certain percentages can be determined according to specific configuration of the interface 700. Information associated with battery can thus be presented in a user-friendly way and the user may determine battery status with desired efficiency.

The data can be presented in a similar manner as playing a media file. For example, as shown in FIG. 7, an entire operation of the mobile platform can be played or paused using a play/pause button 780, fast forwarded at a selected rate using a fast-forward button 782. Any other types of controlling playback of a media file may be included in the presentation of the data.

For example, the smart battery bar 760 on the interface 700 can be shown additionally and/or alternatively on the map 790 on the interface 700. For example, all the information shown on the interface 700 can be superimposed on the map 790 on the interface 700. Thus, a single interface may display all the information of the interface 700.

In various embodiments, the user may view an entire process of an operation, or select a certain point on the travel route (e.g., by tapping on a desired location on the travel route), the travel route data and diagnostic data associated with the desired location can thus be presented.

In one embodiment, on the interface 700, the user can select a certain point on the travel route 702. In response to the selection, the computer device 400 can present the interface 700 to show the travel route data and diagnostic data associated with the desired location. Additionally and/or alternatively, the computer device 400 superimpose the desired travel route data and diagnostic data associated with the desired location directly on the map 790.

The interface 700 may display only a portion of data collected by the computer device. The user may be able to select, e.g., by tapping or mouse-clicking, a desired type of data for viewing more detailed data associated with the selected type. For example, the user can tap on the gimbal pitch meter 710, and a new interface can be displayed to show detailed gimbal values.

Figure 8:
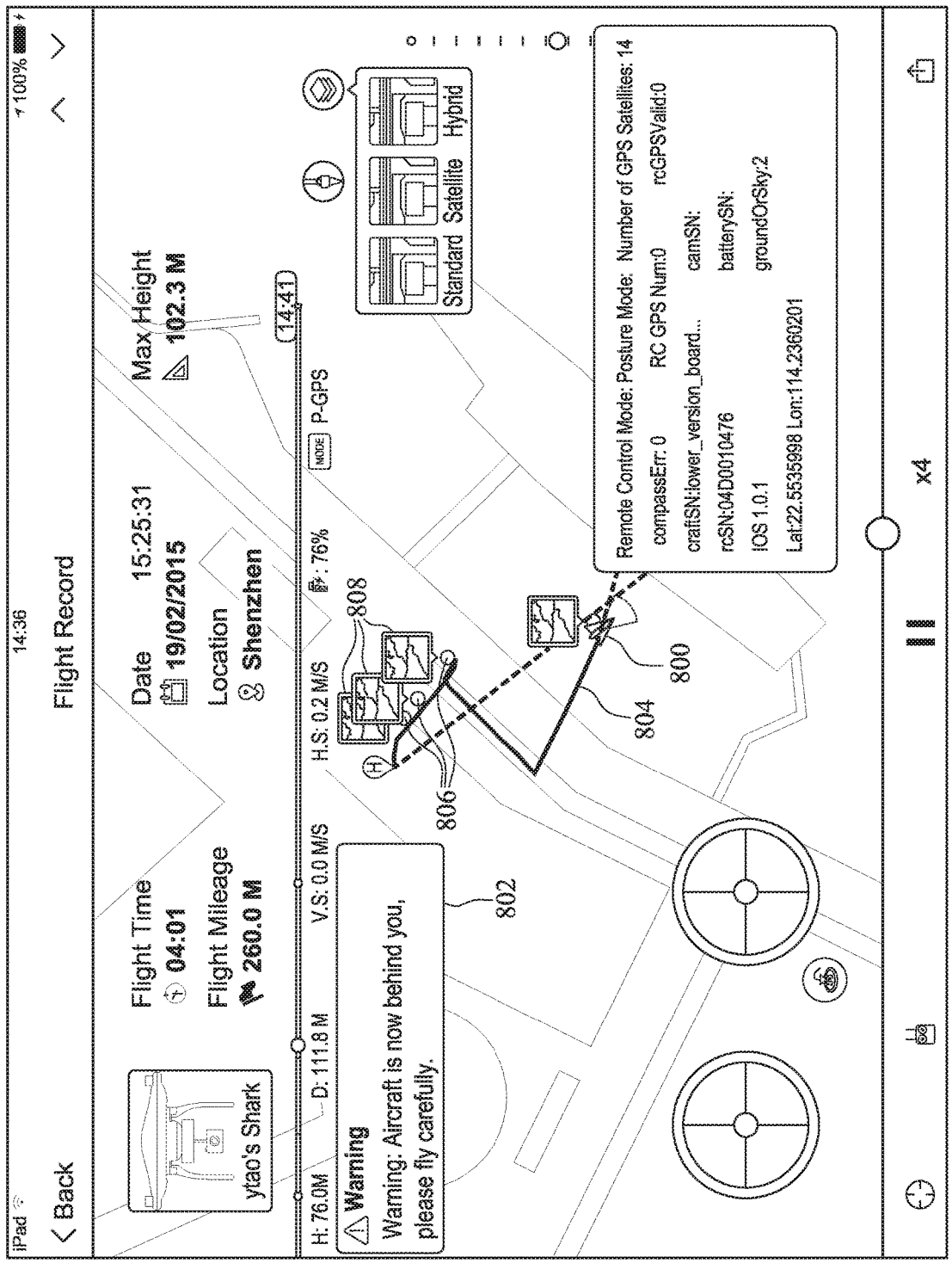
FIG. 8 is another exemplary presentation of travel route data integrated with diagnostic data in accordance with the method of FIG. 2.

FIG. 8 is another exemplary presentation of travel route data integrated with diagnostic data in accordance with the method of FIG. 2. FIG. 8 displays a travel warning 802 that is generated when a mobile platform 800 reaches a location on the travel route 804. In addition, various locations 806 along the travel route 804 are respectively marked with still and/or video images 808 acquired at the locations. Further, when a video is acquired, locations where recording of a video is started and ended can be marked on the travel route.

A user may be able to select an image 808, e.g., by tapping or mouse-clicking. Gimbal data and travel route data when the image is previously acquired can be displayed. Conditions under which the image is acquired can all be available to the user. Further, the interface 700 in FIG. 7 can be combined with the interface shown in FIG. 8, to form a single interface.

Figure 9:
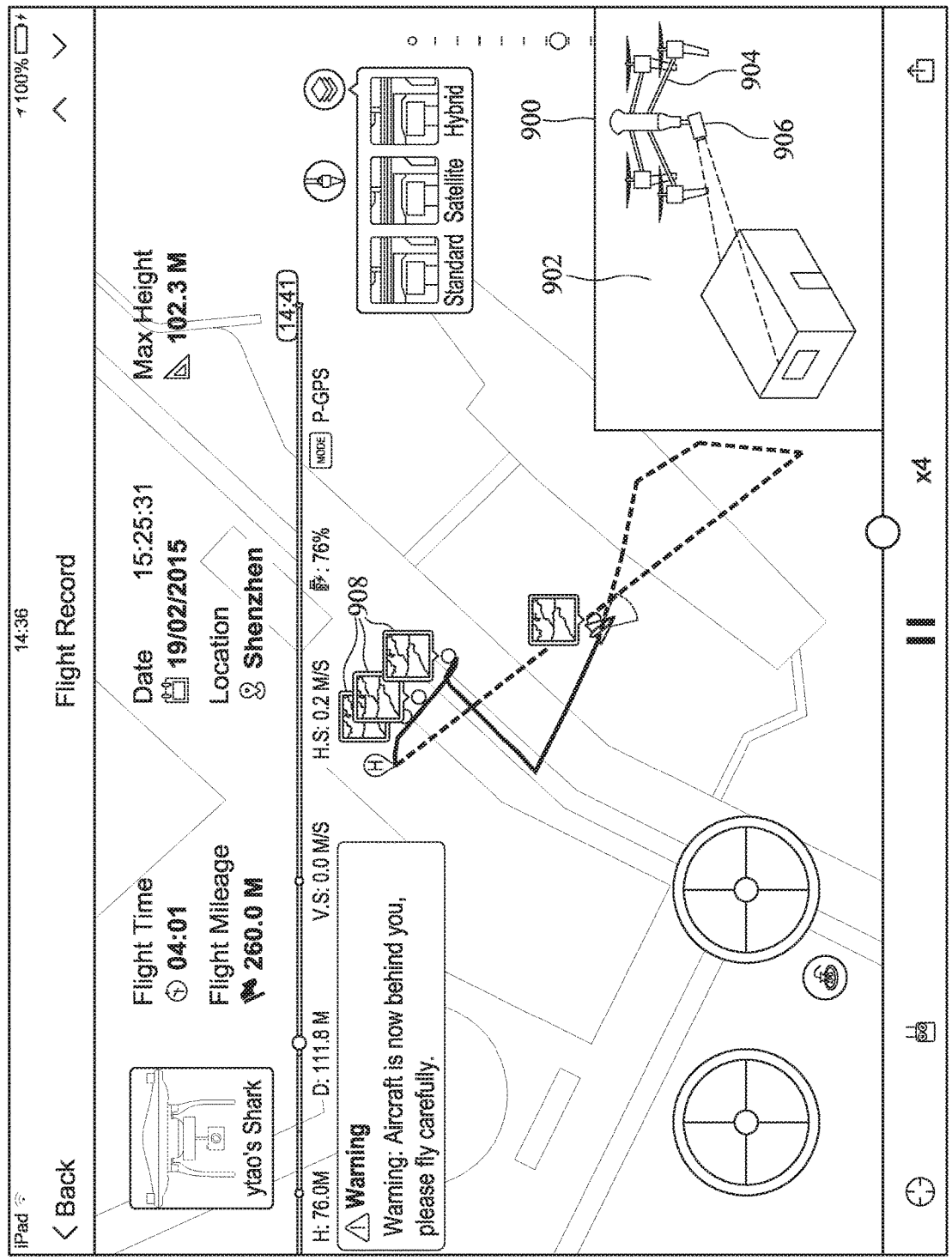
FIG. 9 is another exemplary presentation of travel route data integrated with diagnostic data in accordance with the method of FIG. 2.

FIG. 9 is another exemplary presentation of travel route data integrated with diagnostic data in accordance with the method of FIG. 2. FIG. 9 includes a 3D (3-dimensional)

rendition 900 of a map 902 and a mobile platform 904. A user may be able to select an image 908, and the 3D image can show the map 902 topographically. An orientation of each of the mobile platform 904 and a gimbal 906 (mounted with the camera lens) can be presented in a 3D view. The user can thus more vividly visualize the condition under which the image is acquired. Further, the interface 700 in FIG. 7 can be combined with the interface shown in FIG. 9, to form a single interface.

Specific graphical illustration of data and selection of the data to be displayed can depend on specific design of the interface 700, and is not limited by the present disclosure.

In some embodiments, data are integrated after an operation is completed. In other embodiments, integration of data can be performed substantially in real time with the operation. In that case, data can be pushed to the computer device in a timely manner. The computer device can perform integration at arrival of any data, and present the data while the operation is still in progress. The user may be able to view the operation substantially in real time with the operation.

Further, the computer device may be configured to enable the user to share the travel route data, diagnostic data, and presentation of the integrated data (e.g., displayed interface) to certain desired websites, e.g., social network websites. The travel route data, diagnostic data, and presentation of the integrated data can also be downloaded onto any other appropriate device or computer storage medium.

Further, the mobile platform may be configured such that the travel route data and platform diagnostic data can be downloaded to any other appropriate device or computer storage medium directly from the mobile platform. Further, the remote controller may be configured such that the remote control data can be downloaded to any other appropriate device or computer storage medium directly from the remote controller.

FIG. 10 is an exemplary presentation for displaying operations in accordance with the method of FIG. 2. As shown in FIG. 10, the computer device 400 can provide an interface 1000 listing various operations of one mobile platform or multiple mobile platforms. The operations can be associated with still and/or video images 1002 acquired and parameters 1004 of the operations.

The computer device 400 can display an interface 1000 as shown in FIG. 10. In certain embodiments, a user may select multiple operations on the interface 1000. In response to the selection, the interface 1000 can show collective information 1006 of the selected operations.

Further, the information shown on the interface 1000 can be combined into one interface. Thus, a single interface may display all the information of the interface 1000.

With the travel route data and diagnostic data available, various analysis and diagnosis can be performed for an operation. The analysis or diagnosis may be carried out manually or empirically by a user based on the data. In certain embodiments, the computer device may be configured to automatically apply appropriate algorithms for analysis and diagnosis to provide conclusive results.

The computer device may be configured to detect an inconsistency between a movement, a posture, or a direction of the mobile platform and a platform movement command provided by the remote controller. For example, traditionally, when the mobile platform makes an undesired movement, troubleshooting after the operation may be difficult, because only travel route data are available and platform movement command provided by the remote controller is not collected. The user may not know whether a problem occurs in the mobile platform, or the remote controller does not provide the desired platform movement command. Using the disclosed methods and devices, diagnostic data may include remote control data. Thus, the platform movement command provided by the remote controller is collected, so the cause of undesired movement of the mobile platform can be analyzed.

Further, the computer device may be configured to provide a prompt when an anomaly occurs in the collected data. For example, when the mobile platform has not pushed data at a usual frequency as configured or data collected is out of normal range, the computer device may be able to alert the user of potential malfunction or loss of communication, so the user may respond with corrective actions timely.

Further, the computer device may be configured to estimate a crash location of the mobile platform after ground communication with the mobile platform is lost. In certain embodiments, the computer device is in continuous communication with the mobile platform. Thus, when the mobile platform loses communication with ground, the computer device may detect such an event. Based on a location of the event, the travel route, speed, altitude, and direction of the mobile platform at the time of the event, the computer device may be configured to calculate a possible location of crash of the mobile platform, so the user may locate the crashed mobile platform easily.

Further, the computer device may be configured to provide or set a home point of the mobile platform. In certain embodiments, a home point may refer to a location for the mobile platform to return to after an operation. Thus, the computer device may enable user to set a home point arbitrarily or based on analysis of the collected data.

Further, the computer device can be configured to calculate a threshold battery power that is needed for a return trip to the home point, according to a distance from the mobile platform and the home point. An operation warning can be generated when remaining battery power is below or equal to the threshold battery power, or above the threshold battery power by a certain amount.

Further, the travel route data can further include a direction (or a facing direction) of the mobile platform relative to a travel direction of the mobile platform. However, when the travel route data does not include a direction of the mobile platform relative to a travel direction of the mobile platform, the computer device may be configured to provide such data by integrating the diagnostic data and the travel route data, because the computer device may obtain data of posture of the mobile platform from the diagnostic data.

Figure 11:
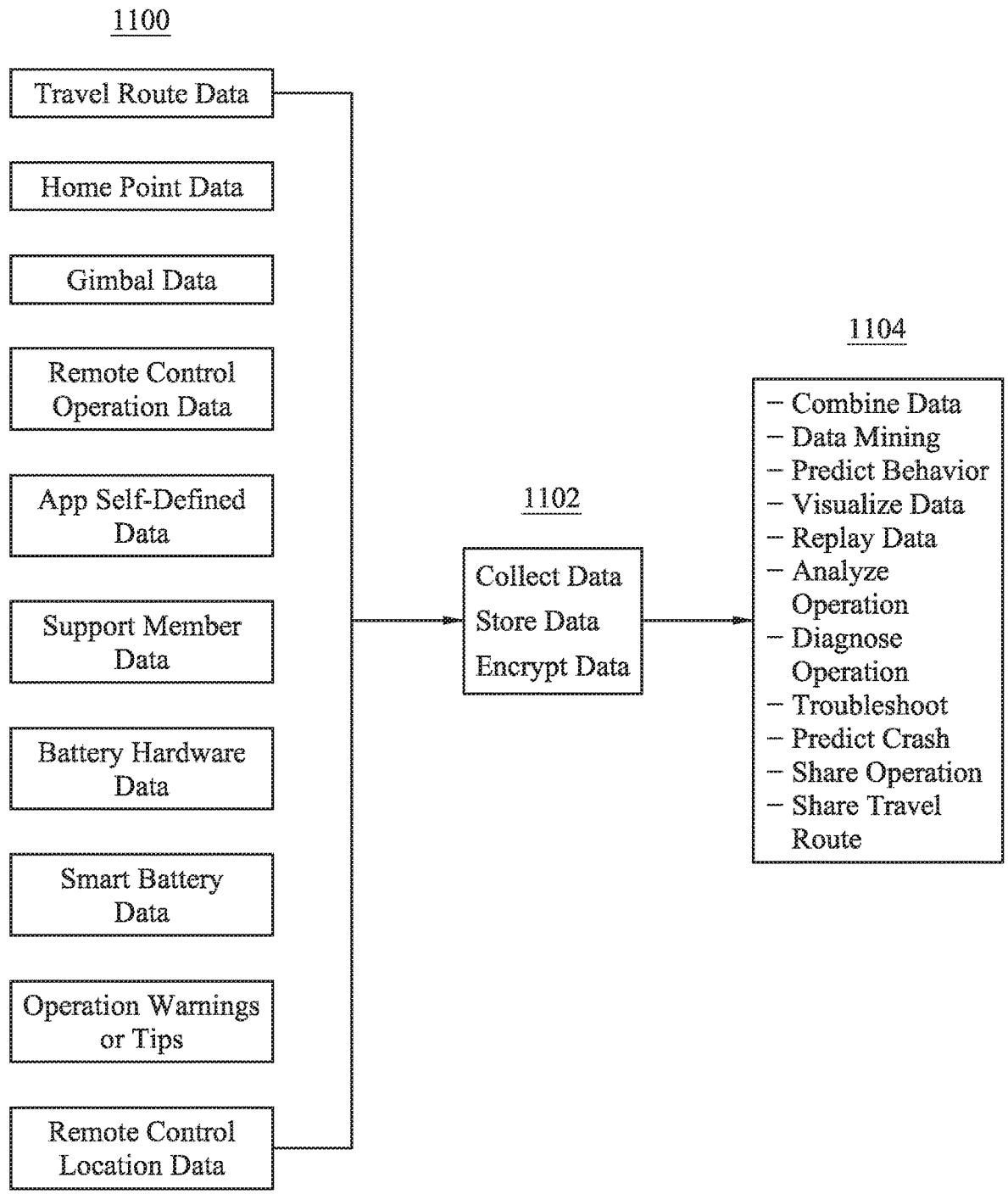
FIG. 11 is an exemplary schematic diagram illustrating data collection and integration in accordance with the method of FIG. 2.

FIG. 11 is an exemplary schematic diagram illustrating data collection and integration in accordance with the method of FIG. 2. A list 1100 includes exemplary data collected by the computer device, including, but not limited to, travel route data, home point data, gimbal data, remote control operation data, app self-defined data, support member data, battery hardware data, smart battery data, operation tip, operation warning, and remote control location data.

A box 1102 depicts exemplary processes performed by the computer device, including but not limited to collecting data, storing data, and encrypting data. A box 1104 depicts exemplary functions that may be accomplished by integrating the data for presentation, including but not limited to combining data, mining data, predicting mobile platform behavior, visualizing data, replaying data, analyzing an operation, diagnosing an operation, troubleshooting, predicting crash, sharing an operation, and sharing a travel route.

Conventionally, analyzing a travel route of a mobile platform can cost considerable time and human labor for various reasons. For example, during an operation performed by a mobile platform, only limited types of data are collected for presentation after the operation. Such types of data may be collected from a GPS module and an accelerometer installed on the mobile platform. After the operation, a travel route may be presented. Further, still and/or video images may be acquired by a payload camera on the mobile platform. In that case, the travel route maybe presented in combination with the images acquired, by associating the images with a corresponding location on the travel route according to the time of acquiring the image.

In order to collect another type of data, a specialized instrument corresponding to the type of data may need to be installed on the mobile platform. For certain types of data, the specialized instrument may even not be available.

As a result, various types of data are not collected, or only collected separately by multiple instruments. Data from the multiple instruments may lack correlation between each other, so integration of data to present a process of an operation may be difficult and of limited value for subsequent analysis. Further, presenting the result of data integration may be inefficient and require significant labor cost. Data cannot be visualized in a timely fashion.

Further, a user may not be able to establish a connection between commands from the user and commands generated by the mobile platform's own controller. To diagnose an operation, specialized technical staff needs to analyze an operation recorder (or a black box) using specialized software. In events of a mobile platform being inoperable, such as a mobile platform being lost, falling in water, being crashed or being significant damaged, causes for operation failure may never be known.

By using the disclosed methods, devices and systems, diagnostic data including platform data and remote control data are collected and integrated with flight route data. Thus, types of data that can be collected are significantly increased. Types of data that requires additional data-collection instruments or not available for collection can be collected and integrated using a computer device without significant labor cost. Connection between user operation, status of a mobile platform and travel route data of the mobile platform can thus be established. Integrated data can be timely presented on a user-friendly interface.

Figure 12:
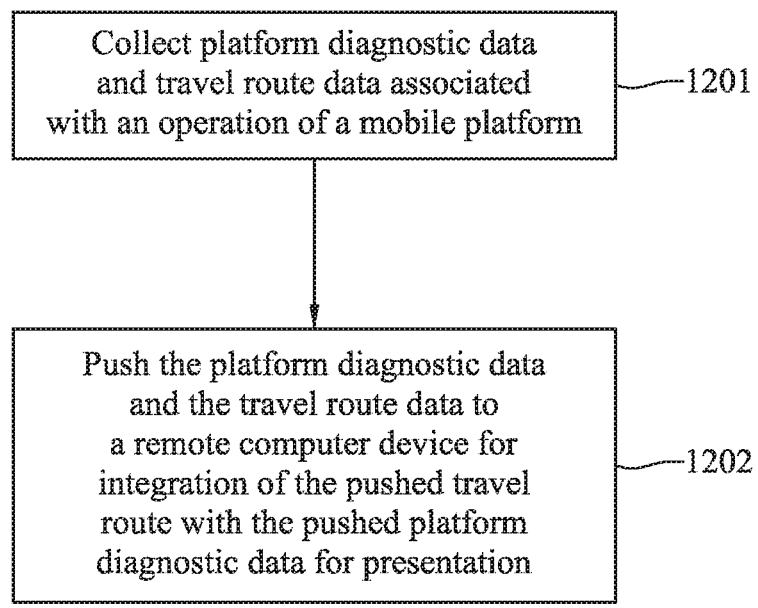
FIG. 12 is a top level flow chart illustrating an alternative embodiment of the method for presenting operational information of FIG. 2.

FIG. 12 is a top level flow chart illustrating an alternative embodiment of the method for presenting operational information of FIG. 2. The method 1200 can be implemented via the mobile platform 300.

Referring to FIG. 12, platform diagnostic data and travel route data associated with an operation of the mobile platform are collected, at 1201. As previously described in more detail above with reference to FIG. 3, the mobile platform 300 can include a controller 310 (shown in FIG. 3) for collecting platform diagnostic data and travel route data associated with an operation of the mobile platform. The mobile platform 300 can collect the platform diagnostic data and the travel route data associated with an operation of the mobile platform 300 using methods similar to or the same as described in various disclosed embodiments, e.g., as shown in FIG. 2, and in FIG. 11.

The platform diagnostic data and the travel route data are pushed to a remote computer device, at 1202, for integration of the pushed travel route data with the pushed platform diagnostic data for presentation. As previously described in FIG. 3, the mobile platform 300 can include a transceiver 370 for pushing the platform diagnostic data and the travel route data to a remote computer device 400. The computer device 400 can be configured to integrate the travel route data with the platform diagnostic data for presentation. The integration of the travel route data with the platform diagnostic data can be performed in the manner described in more detail above with reference to FIGS. 7-11.

Additionally and/or optionally, when a remote controller associated with the mobile platform is used, as shown in FIG. 1B, the platform diagnostic data and the travel route data can be pushed to the remote computer device at 1202, for integration of the travel route data with both of the platform diagnostic data and the remote control data for presentation. The computer device 400 may collect remote control data for such integration.

Figure 13:
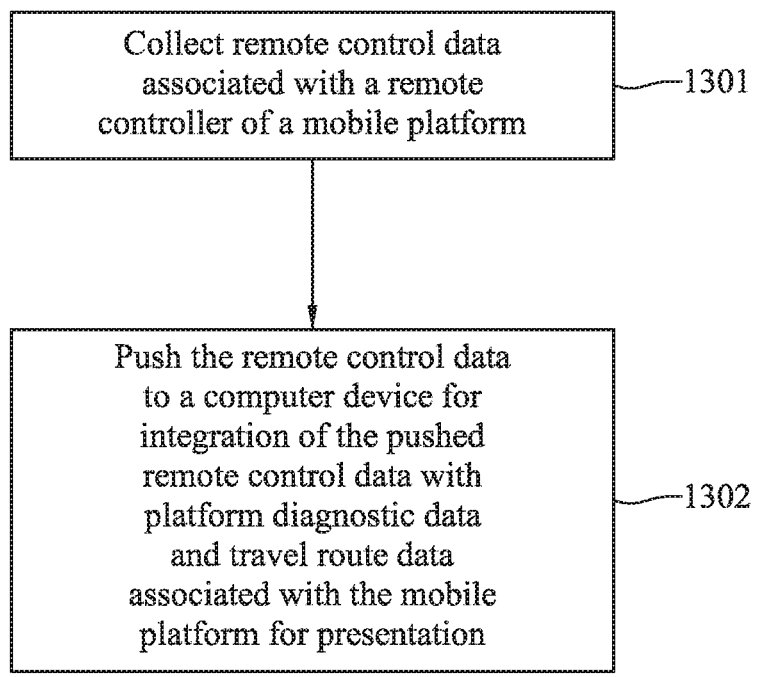
FIG. 13 is a top level flow chart illustrating another alternative embodiment of the method for presenting operational information of FIG. 2.

FIG. 13 is a top level flow chart illustrating another alternative embodiment of the method for presenting operational information of FIG. 2. The method 1301 can be implemented on a remote controller 500 as shown in FIG. 1B.

Referring to FIG. 13, remote control data associated with the remote controller 500 of the mobile platform 300 are collected, at 1301. The remote control data can be associated with an operation of the mobile platform 300. As previously described in FIG. 5, the remote controller 500 can include the processor 540 for collecting remote control data associated with an operation of the mobile platform.

Referring to FIG. 13, the remote control data can be pushed to a computer device, at 1302, for integration of the pushed remote control data with platform diagnostic data and travel route data associated with the mobile platform for presentation. As previously described in FIG. 5, the remote controller 500 can include a transceiver 510 for pushing the remote control data to the computer device 400, for integration of the pushed remote control data with platform diagnostic data and travel route data associated with the mobile platform 300 for presentation. The platform diagnostic data and travel route data associated with the mobile platform 300 can be obtained by the computer device 400 from the mobile platform 300. The computer device 400 can be configured to integrate the remote control data with the platform diagnostic data and the travel route data platform for presentation. The integration of the remote control data with the platform diagnostic data and the travel route data can be performed using methods similar to or the same as described in various disclosed embodiments, e.g., as shown in FIGS. 7-11.

In the system 100B in FIG. 1B, the remote controller 500 and the computer device 400 are physically separate entities. In other words, the remote controller 500 and the computer device 400 are not integrated into one physical device.

However, the computer device 400 depicted in the system 100A of FIG. 1A can be configured to additionally perform the functions of the remote controller 500 of FIG. 1B. In one example, the computer device 400 can be a computer device (e.g., a smart phone, a tablet computer) configured to remotely control the mobile platform 300. In that case, the computer device 400 can include any hardware and/or software integrated thereon to perform functions of a remote controller. In other words, the computer device 400 can have a remote controller integrated thereon. In another example, the computer device 400 can be a remote controller having a structure as shown in FIG. 4 (e.g., having a display integrated thereon) and can perform computation functions for collecting data and integrating data for presentation on the display.

In the system 100A of FIG. 1A, the computer device 400 can receive input from a user and generate an operation command based on the input. The computer device 400 can include the transceiver 408 configured to transmit the operation command to the mobile platform 300. The mobile platform 300 can be configured to receive the operation command from the computer device 300 to be remotely controlled by the computer device 400. Accordingly, the computer device 400 can generate remote control data including remote control operation data, location data associated with the remote controller (i.e., the computer device), and any other appropriate data associated with remotely controlling the mobile platform. The remote control operation data can be generated by the computer device 400 based on the operation command.

The computer device 400 can further collect platform diagnostic data and travel route data associated with the mobile platform 300, and integrate the remote control data, the collected platform diagnostic data, and the collected travel route data, for presentation.

When the method as shown in FIG. 2 is implemented by the computer device 400 in FIG. 1A, collecting the diagnostic data at 201 can include collecting the remote control data. The remote control data can be both generated and stored by the computer device 400 for subsequent integration with the platform diagnostic data and the travel route data collected from the mobile platform 300.

The computer device 400 in FIG. 1A may include the mobile platform app 450 configured to generate and send operation commands for remotely controlling the mobile platform in a similar manner as the remote controller 500 in FIG. 1B and FIG. 5.

Specific construction of the computer device 400 in FIG. 1A is not limited in the present disclosure. In certain embodiments, the computer device 400 can include a mobile phone, a smart phone, a tablet computer, a personal computer, a server computer, or any other appropriate devices. The computer device 400 may be configured to receive an operation command from a user via a touch screen associated with a display system, or any other appropriate input controls. The touch screen may display a control panel having an appearance similar to or different from the remote controller 500 as shown in FIG. 5, and may receive operation commands from the user and send the operation command to the mobile platform for execution, to achieve the same or similar functions as the remote controller.

In certain embodiments, the computer device 400 in FIG. 1A may be constructed to have an external structure similar to the remote controller 500 of FIG. 5. That is, the computer device 400 may have physical component for receiving certain input from a user. The physical components include, e.g., joysticks, switches, keys or buttons, and the like. Further, the computer device 400 may include the display system 412. The display system 412 may optionally include a touch screen for receiving certain input from a user. Thus, the computer device 400 may also be referred to as a "remote controller enabled for collecting data and integrating data for presentation". The computer device 400 can thus be configured to generate remote control data according to the remote control operation commands, and collect platform diagnostic data and travel route data from the mobile platform 300. The platform diagnostic data, travel route data and the remote control data can be integrated for presentation on the display system 412 on the computer device 400.

As previously described in various embodiments, data can be collected by the computer device 400 in a timely manner. The computer device 400 can perform integration at arrival of any data, and present the data while an operation is still in progress. Further, using the computer device 400 as shown in FIG. 1A, the computer device can receive commands for the mobile platform 300 from a user, send the command to the mobile platform 300, collect the remote control data associated with the commands and perform integration using all the presently collected data. The computer device 400 can present the data substantially in real time with respect to receiving the user command, so the user may be visually presented with an effect resulting from the command.

Figure 14:
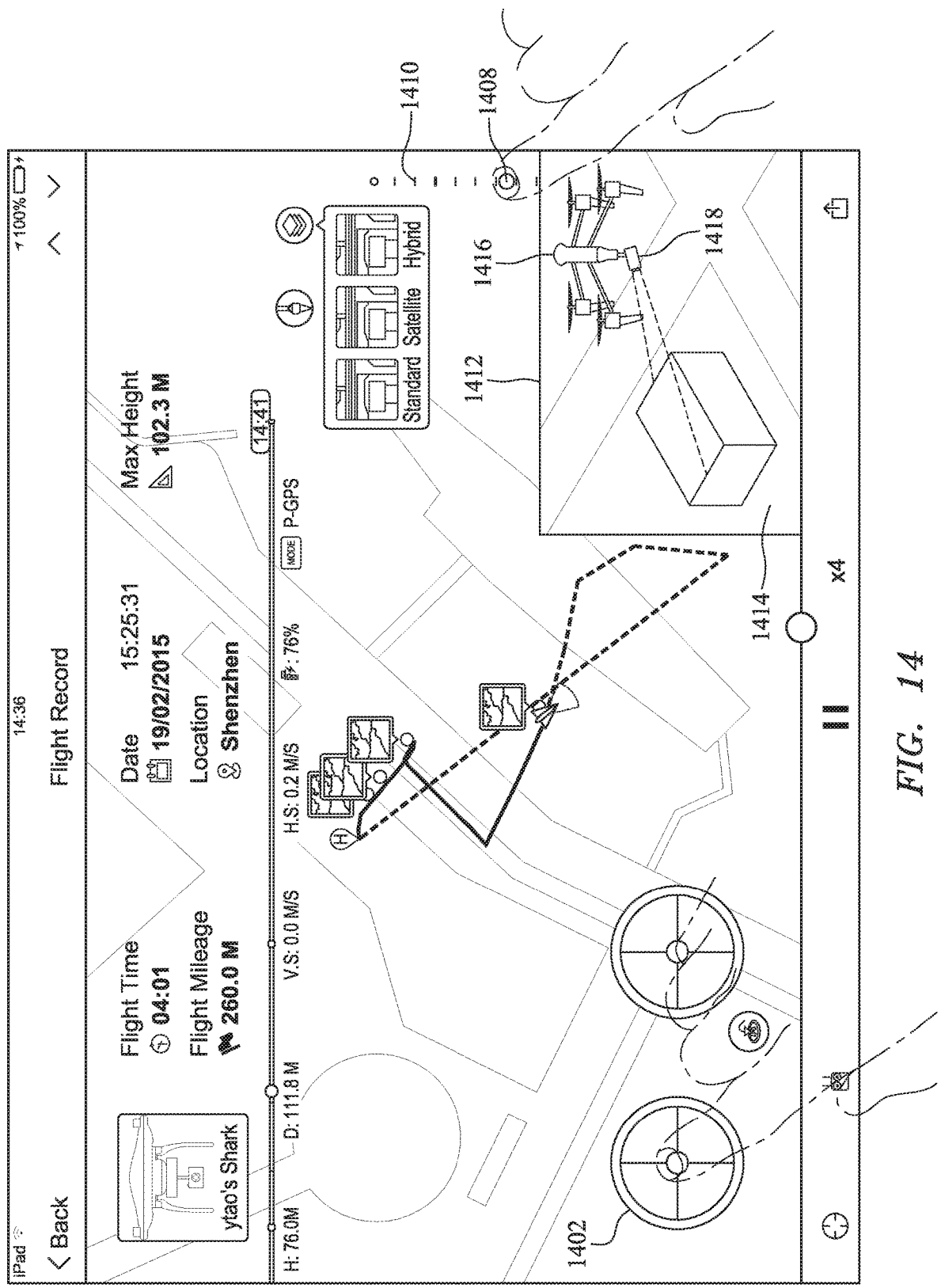
FIG. 14 is another exemplary presentation of remote control operation in accordance with the method of FIG. 2.

FIG. 14 is another exemplary presentation of remote control operation in accordance with the method of FIG. 2. An interface 1400 can include a real-time presentation of diagnostic data integrated with travel route data. Further, a user may send remote control commands to the mobile platform 300 (in FIGS. 1A-1B) by using the interface 1400. For example, in FIG. 14, a user may request a turn by sliding on a joystick icon 1402. The user may adjust a gimbal pitch by sliding the gimbal pitch indicator 1408 along a gimbal pitch meter 1410. Similarly, the interface 1400 may provide other input methods (e.g., on-screen or physical buttons, and the like), for the user to send other conventional remote control commands to the mobile platform 300.

A 3D (3-dimensional) image 1412 of a map 1414, a mobile platform 1416, and a gimbal 1418 (mounted with a camera lens) can be included on the user interface 1400. The changes of both the direction of the mobile platform 1416 and the pitch of the gimbal 1418 resulting from the user's commands can be presented in a 3D manner substantially in real-time. The user can thus visualize the effects of the commands more precisely and may determine subsequent commands more efficiently. For example, the user may desire to acquire a video of a certain portion of the landscape. Being able to view the mobile platform 1416 and the gimbal 1418 in the 3D image 1412, the user may adjust the gimbal pitch with more precision. In addition, because the user can visualize the mobile platform in a 3D setting that humans are accustomed to, a process of analyzing the operation of the mobile platform and interpreting information obtained by the payload, e.g., still and/or video images, can thus be user-friendly and efficient. The user can be provided with a desired experience of operating a mobile platform and analyzing the operation. Further, the interface 700 in FIG. 7 can be combined with the interface shown in FIG. 14, to form a single interface.

Still further, by providing the interface according to various embodiments, in addition to sending operation commands to a mobile platform for immediate execution, collecting and integrating data during or after an operation, the computer device may enable a user to design an operation of the mobile platform. Designing the operation can include drawing a travel route on a map provided on a user interface similar to FIGS. 7-11 and 14. In addition, the computer device may be configured to provide further interfaces for the user to specific further commands for the mobile platform at any location on the travel route and/or at any time during the operation. The commands can include any appropriate operation commands depicted in the present disclosure, e.g., travel speed, travel direction, posture of the mobile terminal, gimbal angle, still and/or video images to be acquired, camera mode for acquiring the image. Any commands associated with an operation of the mobile platform may be designed during the operation, or even before the operation.

The computer device may be configured to generate a series of operation commands for the mobile terminal based on the designed operation. Thus, an operation may be performed by the mobile platform automatically or autonomously without the user inputting commands during the operation.

In various embodiments, the methods as disclosed can be implemented by software coupled with certain necessary universal hardware platform. The methods as disclosed can also be implemented by hardware. Part or all of the steps in the methods in accordance with various embodiments can be accomplished using a program/software to instruct related hardware. The program/software can be stored in a (non-transitory) computer-readable storage medium including, e.g., Read-Only Memory (ROM), RAM, internal memory, register, computer hard disk, removable disk, CD-ROM, optical disk, floppy disk, magnetic disk, or the like. The program/software can include coded instructions to instruct a computer device to execute the methods in accordance with various embodiments.

Each of the identified modules and components correspond to one or more functions described in various systems, mobile platforms, remote controllers and computer devices are merely illustrative. The modules or components depicted as separate entities may be or may not be physically separated. Components shown as units may be or may not be physical units. Further, various modules or components may be combined or otherwise re-arranged in various embodiments, or divided into sub-modules or sub-components for re-arrangements to achieve the functions as disclosed.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for presenting operational information of a mobile platform that includes a transceiver and a processor coupled to the transceiver, comprising:
   receiving, through the transceiver, diagnostic data and travel route data, the travel route data being associated with a movement of the mobile platform during an operation of the mobile platform;
   pushing the travel route data to a memory of a computer device regularly at a predetermined frequency;
   associating, in the memory of the computing device, the diagnostic data with a time stamp that includes a time when the travel route data is pushed to the memory of the computer device based on the predetermined frequency;
   integrating, through the processor, the travel route data in synchronization with the diagnostic data according to the time stamp;
   presenting, through a display system of the computing device, integrated travel route data and diagnostic data; and
   in response to a selection of an arbitrary point on a travel route that is determined by the travel route data, presenting the diagnostic data associated with the travel route data that corresponds to the point, thereby providing a visualized interface to integrate and analyze an operation of the mobile platform.

2. The method of claim 1, wherein receiving the diagnostic data comprises receiving gimbal data of a gimbal mounted on the mobile platform as at least a portion of the diagnostic data.

3. The method of claim 2, wherein integrating the travel route data in synchronization with the diagnostic data comprises providing a gimbal direction of the gimbal relative to a travel direction of the mobile platform.

4. The method of claim 2, wherein integrating the travel route data in synchronization with the diagnostic data comprises providing a pitch of the gimbal.

5. The method of claim 1, further comprising:
   generating a remote control command according to an input from a user; and
   sending the remote control command to the mobile platform for remotely controlling the mobile platform.

6. The method of claim 5, further comprising generating remote control data according to the remote control command.

7. The method of claim 6, wherein receiving the diagnostic data comprises receiving the remote control data as at least a portion of the diagnostic data.

8. The method of claim 1, wherein receiving the diagnostic data comprises receiving remote control operation data from a remote controller associated with the mobile platform as at least a portion of the diagnostic data.

9. The method of claim 8, wherein receiving the diagnostic data further comprises receiving location data from the remote controller as a portion of the diagnostic data.

10. The method of claim 8, wherein integrating the travel route data in synchronization with the diagnostic data comprises detecting an inconsistency between the movement of the mobile platform and a platform movement command provided by the remote controller.

11. An apparatus for presenting operational information of a mobile platform, comprising:
    a transceiver configured for receiving diagnostic data and travel route data, the travel route data being associated with a movement of the mobile platform during an operation of the mobile platform; and
    a processor configured for pushing the travel route data to a memory of a computer device regularly at a predetermined frequency,
    wherein:
        the diagnostic data is associated, in the memory of the computing device, with a time stamp that includes a time when the travel route data is pushed to the memory of the computer device based on the predetermined frequency; and
        the processor is further configured for integrating the travel route data in synchronization with the diagnostic data according to the time stamp, presenting integrated travel route data and diagnostic data via a display system of the computing device, and in response to a selection of an arbitrary point on a travel route that is determined by the travel route data, presenting the diagnostic data associated with the travel route data that corresponds to the point, thereby providing a visualized interface to integrate and analyze an operation of the mobile platform.

12. The apparatus of claim 11, wherein the transceiver is configured for collecting gimbal data of a gimbal mounted on the mobile platform as at least a portion of the diagnostic data.

13. The apparatus of claim 12, wherein the processor is configured for providing a gimbal direction of the gimbal relative to a travel direction of the mobile platform.

14. The apparatus of claim 12, wherein the processor is configured for providing a pitch of the gimbal.

15. The apparatus of claim 11, wherein:
the processor is further configured for generating a remote control command according to an input from a user; and
the transceiver is further configured for sending the remote control command to the mobile platform for remotely controlling the mobile platform.

16. The apparatus of claim 15, wherein the processor is further configured for generating remote control data according to the remote control command.

17. The apparatus of claim 16, wherein the processor is further configured for collecting the remote control data.

18. The apparatus of claim 11, wherein the transceiver is configured for collecting remote control operation data from a remote controller of the mobile platform as at least a portion of the diagnostic data.

19. The apparatus of claim 18, wherein the transceiver is configured for collecting location data from the remote controller of the mobile platform as a portion of the diagnostic data.

20. The apparatus of claim 18, wherein the processor is configured for detecting an inconsistency between the movement of the mobile platform and a platform movement command provided by the remote controller.

* * * * *